US 11,593,529 B2

(12) United States Patent
Shanbhogue et al.

(10) Patent No.: US 11,593,529 B2
(45) Date of Patent: Feb. 28, 2023

(54) DEVICE INTERFACE SECURITY MANAGEMENT FOR COMPUTER BUSES

(71) Applicant: Intel Corporation, Santa Clara, CA (US)

(72) Inventors: Vedvyas Shanbhogue, Austin, TX (US); Utkarsh Y. Kakaiya, Folsom, CA (US); Ravi Sahita, Portland, OR (US); Abhishek Basak, Hillsboro, OR (US); Pradeep Pappachan, Tualatin, OR (US); Erdem Aktas, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 16/687,561

(22) Filed: Nov. 18, 2019

(65) Prior Publication Data

US 2020/0159969 A1    May 21, 2020

Related U.S. Application Data

(60) Provisional application No. 62/879,674, filed on Jul. 29, 2019.

(51) Int. Cl.
*G06F 21/85* (2013.01)
*G06F 9/455* (2018.01)
(Continued)

(52) U.S. Cl.
CPC .......... *G06F 21/85* (2013.01); *G06F 9/45558* (2013.01); *G06F 13/28* (2013.01);
(Continued)

(58) Field of Classification Search
CPC ............ G06F 9/45558; G06F 13/4282; G06F 13/45558; G06F 21/44; G06F 21/85;
(Continued)

(56) References Cited

U.S. PATENT DOCUMENTS

| | | | |
|---|---|---|---|
| 8,954,788 B2 * | 2/2015 | Abraham | G06F 11/0745 714/4.5 |
| 2012/0254862 A1 * | 10/2012 | Dong | G06F 9/4411 718/1 |

(Continued)

OTHER PUBLICATIONS

Examination Report dated Jul. 27, 2021 for Indian Patent Application No. 202044010348, 7 pages.
(Continued)

*Primary Examiner* — Eric T Oberly
(74) *Attorney, Agent, or Firm* — Schwabe, Williamson & Wyatt, P.C.

(57) ABSTRACT

Systems, apparatuses, methods, and computer-readable media are provided for device interface management. A device includes a device interface, a virtual machine (VM) includes a device driver, both to facilitate assignment of the device to the VM, access of the device by the VM, or removal of the device from being assigned to the VM. The VM is managed by a hypervisor of a computing platform coupled to the device by a computer bus. The device interface includes logic in support of a device management protocol to place the device interface in an unlocked state, a locked state to prevent changes to be made to the device interface, or an operational state to enable access to device registers of the device by the VM or direct memory access to memory address spaces of the VM, or an error state. Other embodiments may be described and/or claimed.

21 Claims, 17 Drawing Sheets

(51) Int. Cl.
*G06F 13/28* (2006.01)
*G06F 21/44* (2013.01)
*G06F 13/42* (2006.01)

(52) U.S. Cl.
CPC .......... *G06F 13/4282* (2013.01); *G06F 21/44* (2013.01); *G06F 2009/45579* (2013.01); *G06F 2009/45587* (2013.01); *G06F 2213/0026* (2013.01)

(58) Field of Classification Search
CPC . G06F 2009/45579; G06F 2009/45587; G06F 2213/0026
See application file for complete search history.

(56) References Cited

U.S. PATENT DOCUMENTS

| | | |
|---|---|---|
| 2014/0022976 A1 | 8/2014 | Abraham et al. |
| 2018/0107608 A1* | 4/2018 | Kaplan ............... G06F 12/1466 |
| 2019/0227827 A1 | 7/2019 | Zmudzinski et al. |
| 2019/0311123 A1* | 10/2019 | Lal .......................... H04L 41/28 |

OTHER PUBLICATIONS

Extended European Search Report dated Jul. 31, 2020 for EP Application No. 20163560.4, 9 pages.

\* cited by examiner

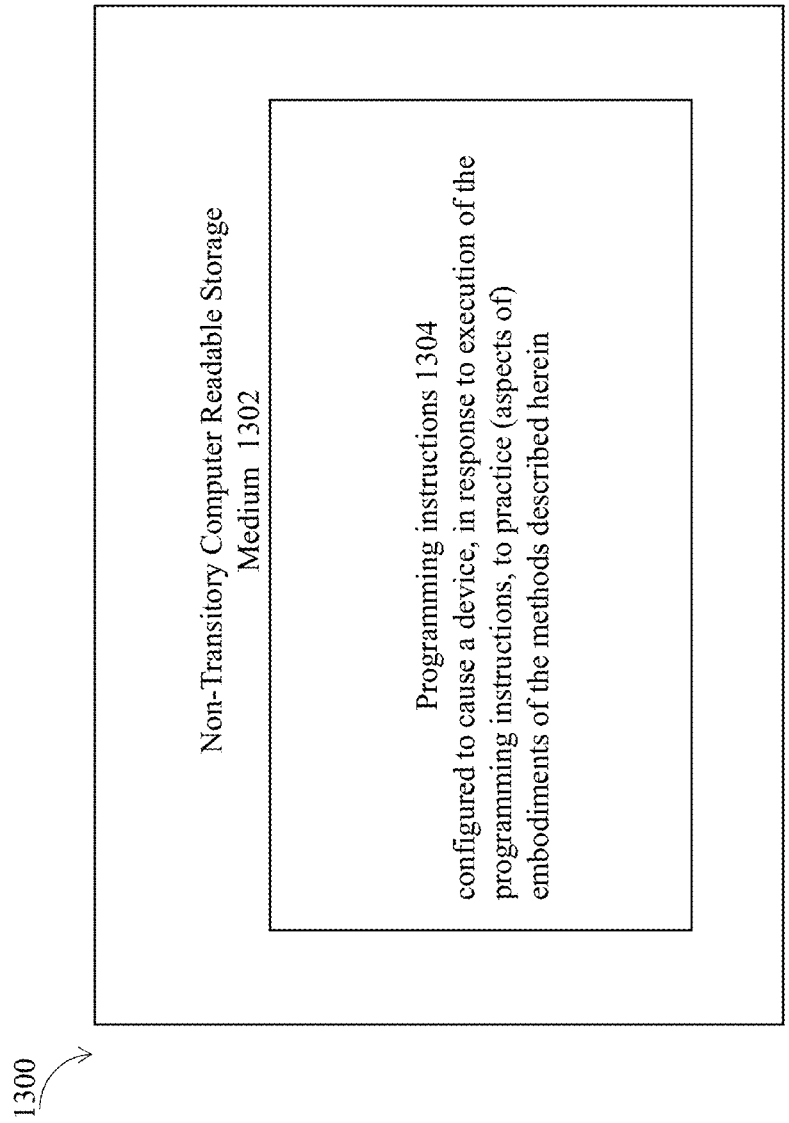

DEVICE INTERFACE SECURITY MANAGEMENT FOR COMPUTER BUSES

RELATED APPLICATIONS

The present application claims priority under 35 U.S.C. § 119 to U.S. Provisional Application No. 62/879,674 filed on Jul. 29, 2019, the contents of which are hereby incorporated by reference in their entireties.

FIELD

Various embodiments generally may relate to the field of communication and computing, and in particular, may relate to security and protection of communication between computing devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer system, or a platform, may include many components, such as a host including a central processing unit (CPU), memory, chipsets, and/or many other devices coupled together by a computer bus. A computer bus is a communication system that may transfer data between devices or components inside a computer, or between computers. A computing system or a platform may use various devices coupled to a computer bus extensively. A computer bus may include related hardware components (wire, optical fiber, etc.) and software, including communication protocols. There may be many kinds of computer bus, such as serial buses or parallel buses.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 13 illustrates a storage medium having instructions for practicing methods described with references to FIGS. 1-12, in accordance with various embodiments.

DETAILED DESCRIPTION

Figure 1:
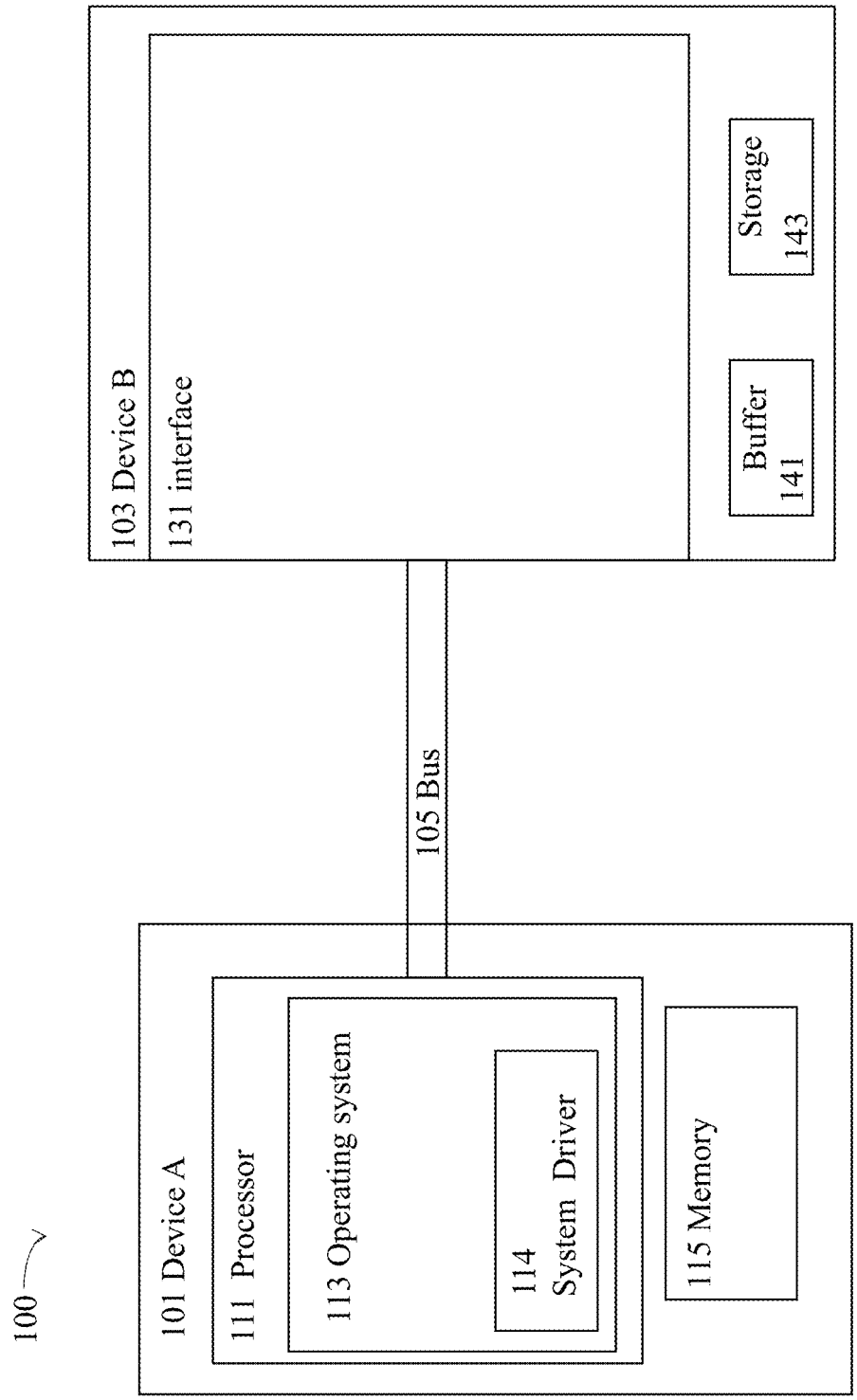
FIG. 1 illustrates an example apparatus including a device coupled to another device by a computer bus, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link. In the description below, a PCI bus or a PCIe bus may be used as an example of a computer bus. Similarly, a PCI device or a PCIe device may be used as an example of a device coupled to a computer bus. Descriptions about a PCIe device may be applicable to any other device coupled to any computer bus. For example, a PCI request, which may be simply referred to as a request, may be an example of a communication request for a link of a computer bus.

Embodiments herein are related to a computing platform including a virtual machine (VM) managed by a hypervisor, where the computing platform is coupled to a device by a computer bus. The hypervisor may be interchangeably or alternately referred to as a virtual machine monitor (VMM). The device includes a device interface to facilitate assignment of the device to the VM, or removal of the device from being assigned to the VM. The device interface may be in one of three states, an unlocked state as a default state of the device, a locked state to prevent changes to be made to the device interface, an operational state to enable access to device registers of the device by the VM or direct memory access (DMA) from the device to memory address spaces of the VM, or an error state to indicate an error has happened.

There may be multiple VMs managed by the hypervisor. There may be a resource arbitration module managed by the hypervisor to coordinate the access of the device by multiple VMs.

In embodiments, the VM may be a trusted VM. Sometimes, a trusted VM may not include the hypervisor of a computing platform in its trusted computing base (TCB) for the trusted VM. In other words, the memory content and the runtime central processing unit (CPU) states of the trusted VM may be kept confidential and integrity-protected from the hypervisor and other VMs managed by the hypervisor to prevent data exfiltration or tamper attacks. Example user cases may include a cloud service provider (CSP), e.g., Microsoft Azure®, which hosts many tenant VM workloads. Both the CSP and the cloud tenant VMs desire confidentiality for the VM workloads.

In some embodiments, a trusted VM may be a virtual machine guest called Trust Domain (TD). A TD runs in a CPU mode that protects the confidentiality of its memory contents and its CPU states from any other software, including the hosting virtual machine monitor (VMM), which is a hypervisor, unless explicitly shared by the TD itself. A CPU may provide a security capability called trust domain extensions (TDX) to meet additional security objectives via the use of memory encryption and integrity via the Memory Controller engines (MK-TME) and specific CPU extensions to manage the confidentiality of the keys used to encrypt the TD memory as well as to protect the CPU state of the TDs. A TDX may be used to extend virtual machines extensions (VMX) with the new kind of virtual machine guest, e.g., a TD.

To enable direct assignment of computer bus device, e.g., PCIe/Compute Express Link (CXL) devices, to a TD, a protocol is presented herein to lock down device interfaces, report the configurations of the device interfaces in a trusted manner, provide a trusted mechanism to make the device interface operational, and a trusted mechanism to flush the interface to make it non-operational. Embodiments herein present a protocol to perform these operations to PCIe device security enhancements. Techniques presented in the current disclosure are applicable to TDX, but can also be applied to other security approaches similar to TDX, e.g., applicable to provide end-to-end security over a PCIe bus, or any other computer bus.

In embodiments, a device includes a device interface to facilitate assignment of the device to a VM managed by a hypervisor of a computing platform coupled to the device by a computer bus. The device interface is also to facilitate access of the device by the VM, or removal of the device from being assigned to the VM. In detail, the device interface includes logic in support of a device management protocol to place the device interface in an unlocked state as a default state of the device, a locked state to prevent changes to be made to the device interface, or an operational state to enable access to device registers of the device by the VM or direct memory access (DMA) from the device to memory address spaces of the VM.

Embodiments disclosed herein include at least one or more non-transitory computer-readable media having instructions. In response to execution of the instructions by one or more hardware processors of a computing platform, the instructions provide a VM on the computing platform. The VM includes a device driver to facilitate assignment of a device interface for a device to the VM managed by a hypervisor of the computing platform, access of the device by the VM, or removal of the device from being assigned to the VM. The device is coupled to the computing platform by a computer bus. The device driver includes support of a device management protocol to cause the device interface to be placed in a default unlocked state, a locked state to prevent changes to be made to the device interface, an operational state to enable access to device registers of the device by the VM or direct memory access (DMA) from the device to memory address spaces of the VM, or an error state to indicate an error has happened.

Embodiments disclosed herein include a computing platform having one or more processors. A hypervisor is arranged to operate on the one or more processors. The hypervisor is arranged to manage operations of a VM. The hypervisor is also to facilitate assignment of a device interface of a device to the VM, access of the device by the VM, or removal of the device from being assigned to the VM. The device is coupled to the computing platform by a computer bus. The device interface includes logic in support of a device management protocol to place the device interface in an unlocked state as a default state of the device, a locked state to prevent changes to be made to the device interface, an operational state to enable access to device registers of the device by the VM or direct memory access (DMA) from the device to memory address spaces of the VM, or an error state to indicate an error has happened.

Embodiments disclosed herein include at least one or more non-transitory computer-readable media having instructions. In response to execution of the instructions by one or more hardware processors of a computing platform, the instructions provide a resource arbitration module arranged to be operated by a hypervisor on the computing platform. The resource arbitration module is to manage assignment of a device interface for a device to a VM managed by the hypervisor, access of the device by the VM, or removal of the device from being assigned to the VM. The device is coupled to the computing platform by a computer bus. The resource arbitration module includes support of a device management protocol to cause the device interface to be placed in a default unlocked state, a locked state to prevent changes to be made to the device interface, an operational state to enable access to device registers of the device by the VM or direct memory access (DMA) from the device to memory address spaces of the VM, or an error state to indicate an error has happened.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Figure 2A:
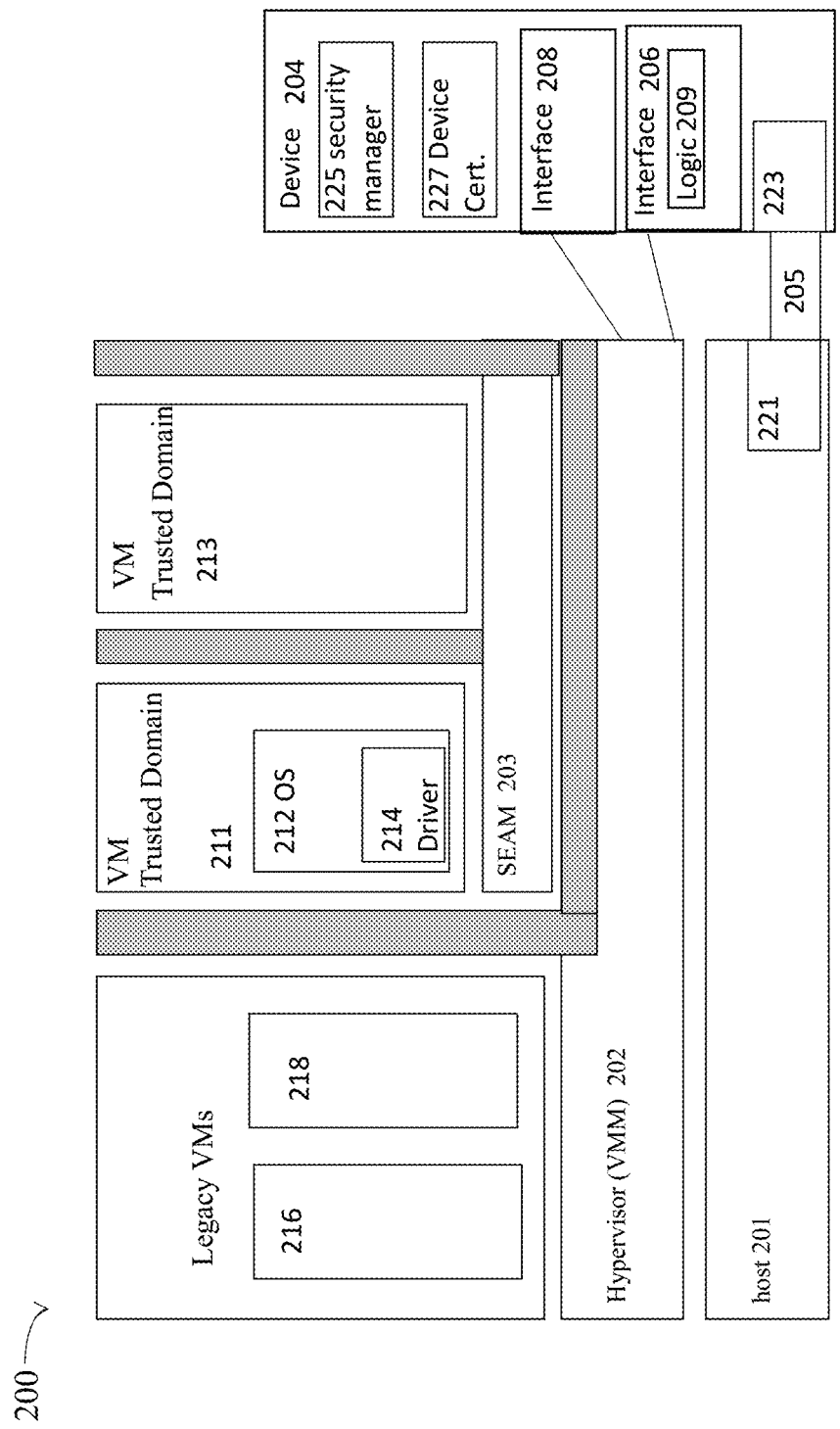
FIGS. 2(a)-2(c) illustrate example device interfaces for a computing platform including a virtual machine (VM) managed by a hypervisor, which is coupled to a device by a computer bus, in accordance with various embodiments.

FIG. 1 illustrates an example apparatus 100 including a device 101, e.g., a host, coupled to another device 103 by a computer bus 105, in accordance with various embodiments. For clarity, features of the apparatus 100, the device 101, the device 103, and the computer bus 105, are described below as an example. It is to be understood that there may be more or fewer components included in the apparatus 100, the device 101, the device 103, and the computer bus 105. Further, it is to be understood that one or more of the devices and components within the apparatus 100 may include additional and/or varying features from the description below, and may include any device that one having ordinary skill in the art would consider and/or refer to as a host, a device, and a computer bus. In embodiments, the device 103 includes an interface 131, and the device 101 includes a system driver 114, which may be examples of a device interface 206 of the device 204 and the driver 214 of a VM 211, as shown in FIG. 2(a).

In embodiments, the device 101 may include the processor 111 and a memory 115. An operating system 113 may operate on the processor 111, and may include a system driver 114. The device 103 may be coupled to the processor 101 by the computer bus 105. The device 103 may include an interface 131 coupled to the computer bus 105, a buffer 141, and a storage 143. The interface 131 may include one or more registers, such as a capability header register, an authentication header register, an authentication capability register, an authentication status register, an authentication control register, a write data mailbox register, a read data mailbox register, or some other registers.

In embodiments, the apparatus 100 may be any computing system or platform, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the apparatus 100 may also be a non-mobile device that may include, but is not to be limited to, for example, a personal computer (PC), a television, a smart television, a data communication device, a media playing device, a gaming console, a gateway, an Internet of Things (JOT) device, etc. The apparatus 100 may include controllers (or processors) and other components that execute software and/or control hardware to execute local programs or consume services provided by external service providers over a network. For example, the apparatus 100 may include one or more software clients or applications that run locally and/or utilize or access web-based services (e.g., online stores or services, social networking services, etc.). The apparatus 100 may also, or instead, include a web interface running in a browser from which the electronic apparatus can access such web-based services. The apparatus 100 may also include storage devices to store logic and data associated with the programs and services used by the apparatus 100.

In embodiments, the processor 111 may be a central processing unit (CPU). In some embodiments, the processor 111 may be a programmable device that may execute a program, e.g., the system driver 114. In embodiments, the processor 111 may be a microcontroller, a 16-bit processor, a 32-bit processor, a 64-bit processor, a single core processor, a multi-core processor, a digital signal processor, an embedded processor, or any other processor.

In embodiments, the operating system 113 may be any system software that manages hardware or software resources for the apparatus 100, and may provide services to applications, e.g., the system driver 114. The operating system 113 may be Windows®, Android OS, iOS, Linux, a real-time operating system (RTOS), an automotive infotainment operating system, among others. For example, the operating system 113 may be a real-time operating system such as VxWorks, PikeOS, eCos, QNX, MontaVista Linux, RTLinux, Windows CE, or other operating system.

In embodiments, the computer bus 105 may be an external computer bus, an internal computer bus, a serial computer bus, or a parallel computer bus. For example, the computer bus 105 may be a PCI bus, a PCI Extended bus (PCI-X), a PCI express bus, a universal serial bus (USB), a parallel advanced technology attachment (PATA) bus, a serial ATA (SATA) bus, an inter-integrated circuit (I²C) bus, an IEEE 1394 interface (FireWire) bus, a small computer system interface (SCSI) bus, a scalable coherent interface (SCI) bus, or other computer bus.

In embodiments, the device 103 may be any piece of computer hardware. For example, the device 103 may be a network interface card, an audio card, a video controller, an Ethernet controller, a webcam, mouse, a Bluetooth controller, a PCI to ISA bridge, a GUI Accelerator, an ATM Controller, a multimedia card, a SCSI controller, a multimedia device, a MPEG-II Video Decoder, or any input/output device. In embodiments, the device 103 may be a PCI device, which may be plugged directly into a PCI slot on a computer's motherboard. In some other embodiments, the device 103 may be coupled to the processor 111 by a different computer bus.

Figure 2B:
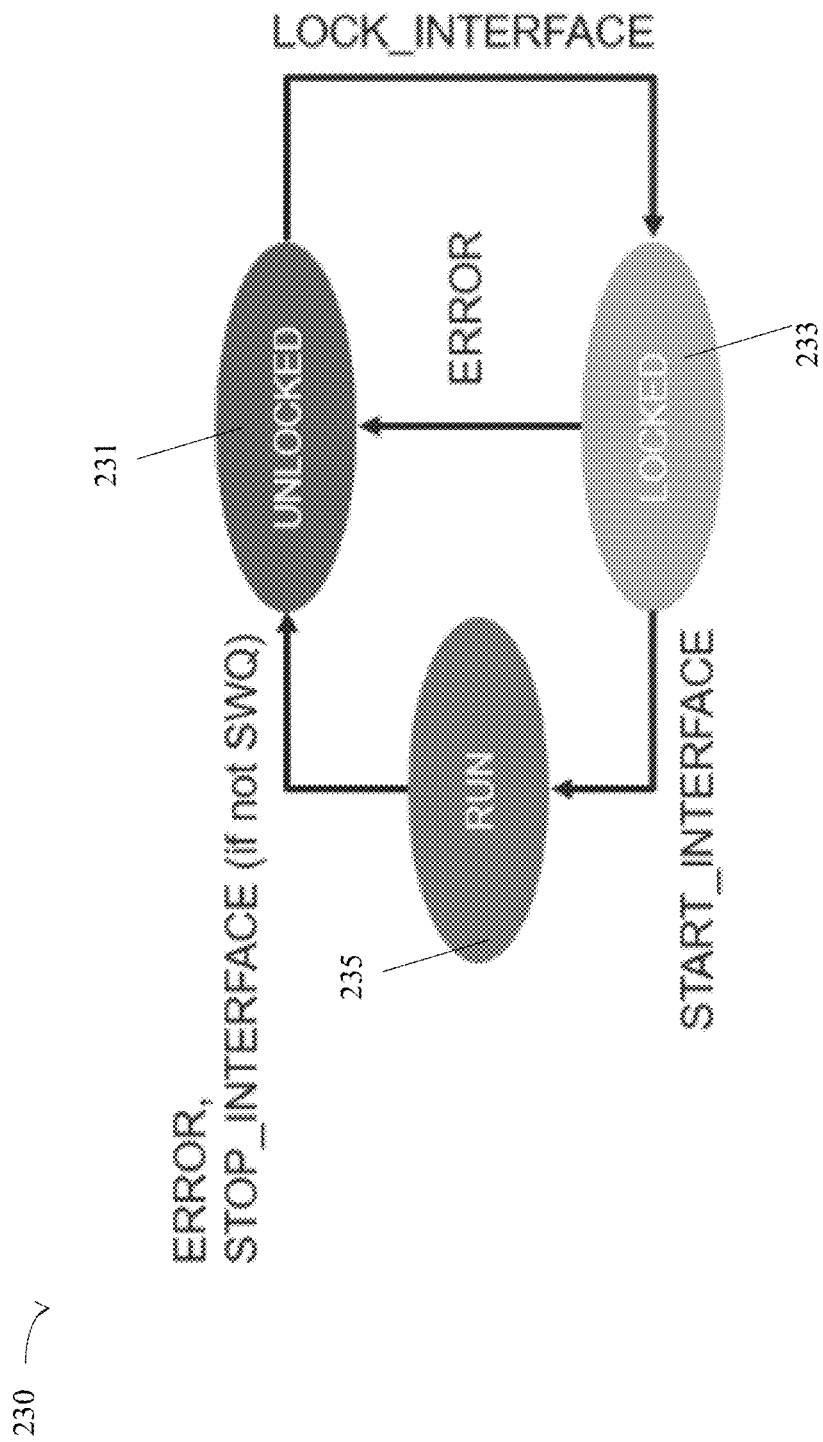
Figure 2C:
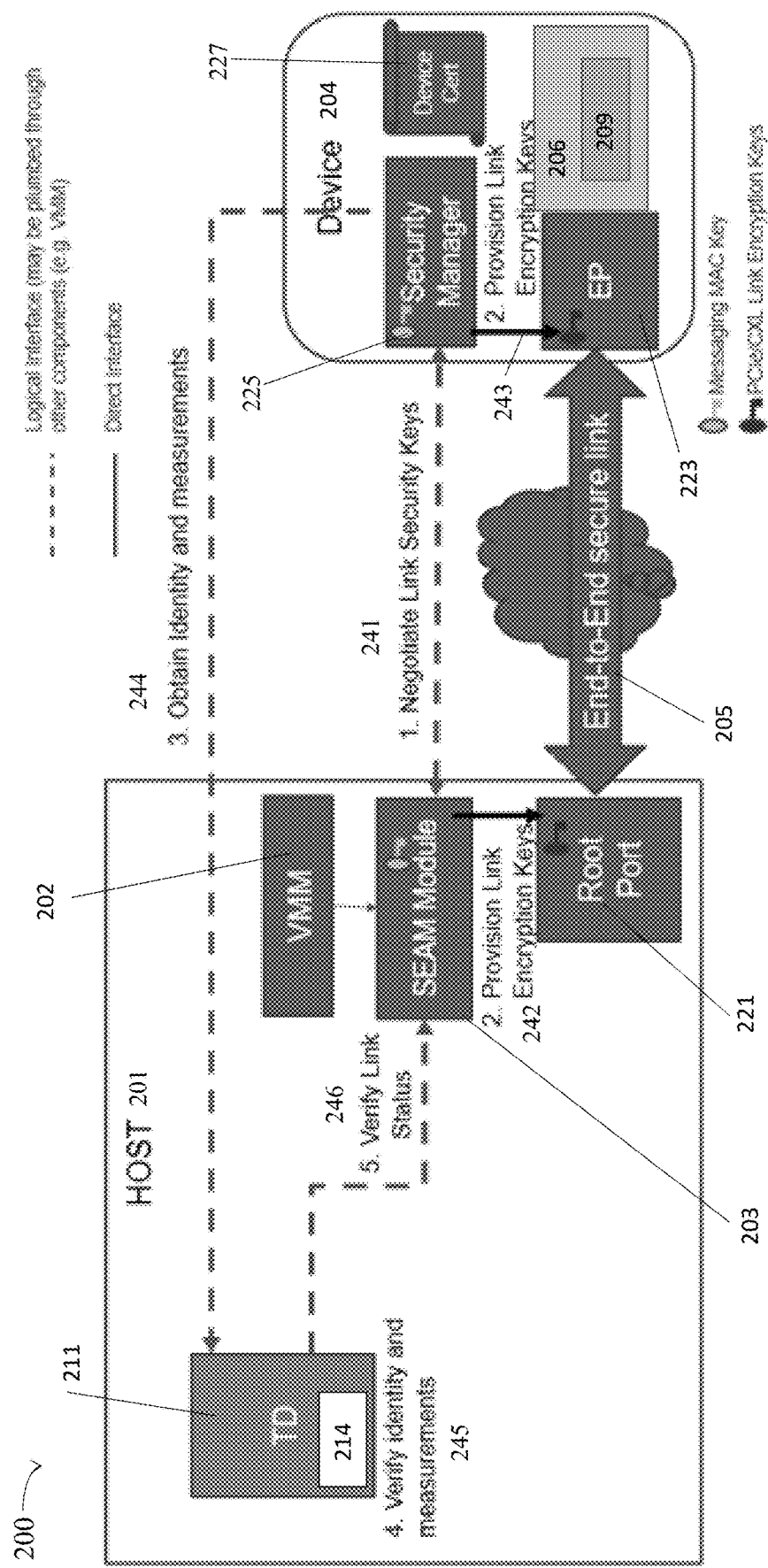
Figure 3A:
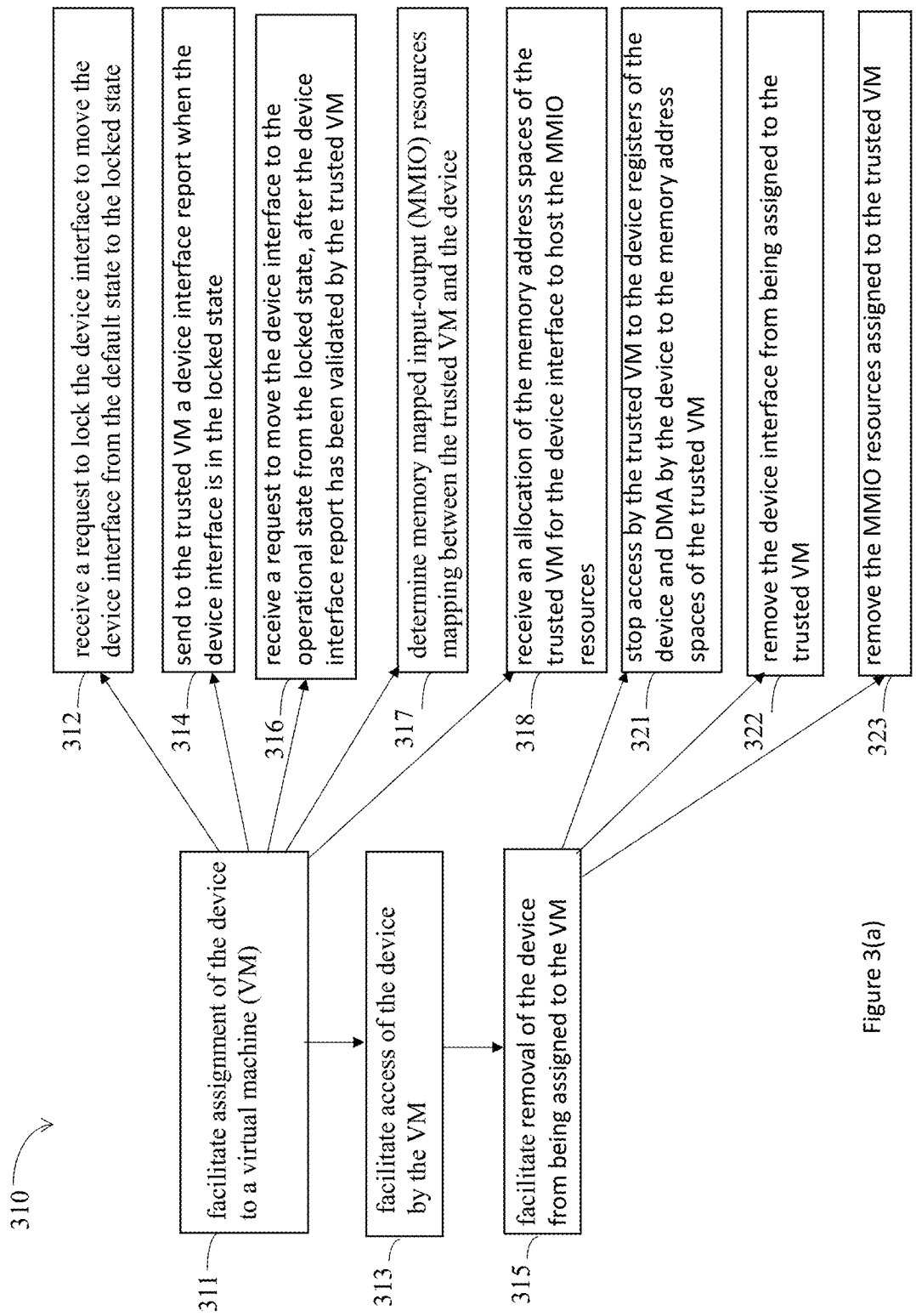
FIGS. 3(a)-3(c) illustrate example processes for managing device interfaces performed by a device interface, a VM, and a hypervisor, in accordance with various embodiments.
Figure 3B:
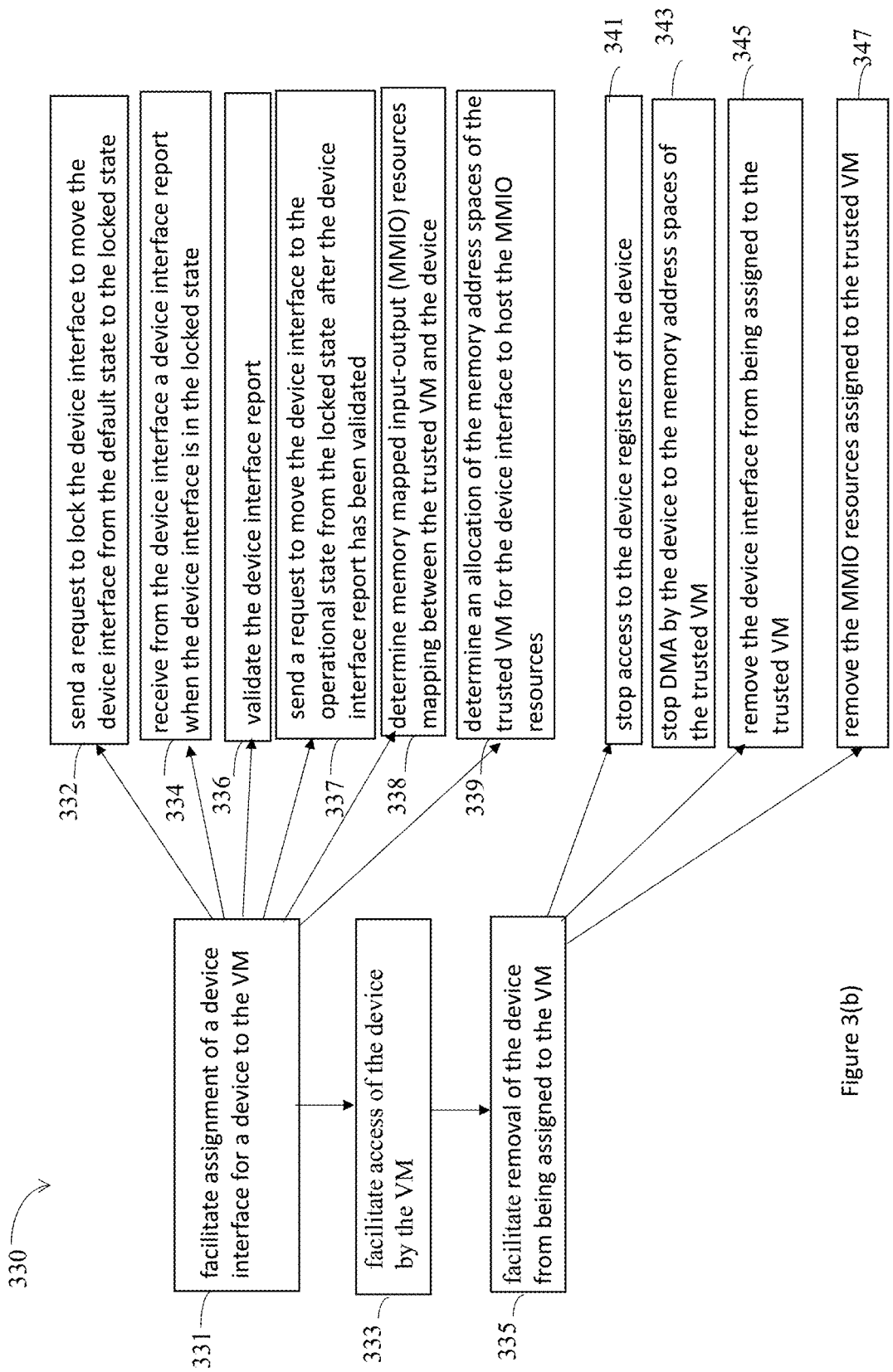
Figure 3C:
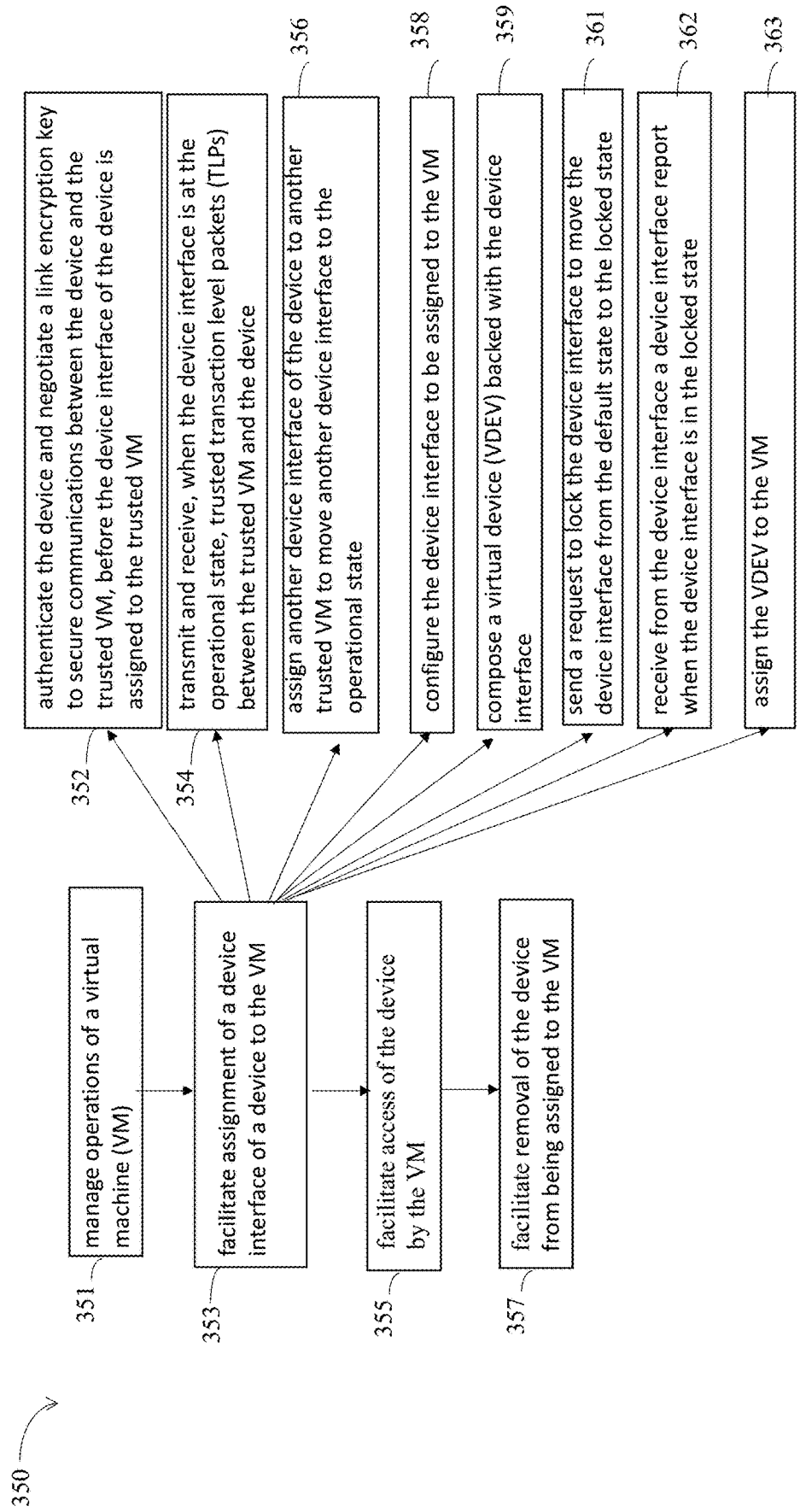

FIGS. 2(a)-2(c) illustrate example device interfaces, e.g., a device interface 206, for computing platform 200 including a VM, e.g., a VM 211, managed by a hypervisor 202, which is coupled to a device 204 by a computer bus 205, in accordance with various embodiments. FIGS. 3(a)-3(c)

illustrate example processes for managing device interfaces performed by a device interface, a VM, and a hypervisor, in accordance with various embodiments. In some embodiments, the VM 211 may be a TD, and the computing platform 200 further includes other TDX components. In embodiments, the computing platform 200, the VM 211, or the device 204 may be an example of the device 101 or the device 103, while the device interface 206 and a device driver 214 may be examples of the interface 131 and the system driver 114 as shown in FIG. 1.

In embodiments, the computing platform 200 includes one or more VMs, e.g., a VM 211, managed by the hypervisor 202, which is operated on one or more processors 201. The computing platform 200 is coupled to the device 204 by the computer bus 205, where the computer bus 205 is coupled to a port 221, e.g., a root port, of the computing platform 200, and a port 223, e.g., an end point of the device 204. The computer bus 205 may include a peripheral component interconnect (PCI) bus, a PCI Extended bus (PCI-X), a PCI express bus, a CLX 2.0 bus, a CLX 1.1 bus, or any other computer bus. The device 204 may include a mouse, a disk, a keyboard, a memory device, or an input/output controller. The device 204 may include various components, e.g., a security manager 225, and a device certificate 227.

In some embodiments, the VM 211 may be a trusted VM, e.g., a TD, which memory contents and CPU states are kept confidential from the hypervisor 202 and other VMs managed by the hypervisor 202. The hypervisor 202 may be a hosting virtual machine monitor (VMM), or a trust domain resource manager (TDRM) as a VMM software extension that supports TDX operation. There may be multiple trusted VMs, e.g., a trusted VM 213, managed by the hypervisor 202. In addition, there may be one or more other VM, e.g., a VM 216, or a VM 218. In some other embodiments, the VM 211 and the VM 216 may be different VMs with different level of security mechanisms. For example, the hypervisor 202, e.g., a VMM, that works as TDRM can launch and manage both TDs and "legacy" VMs. The VM 211 may include an operating system (OS) 212, which may further include a device driver 214. The VM 211 may access the device 204 through the device driver 214 and a device interface, e.g., the device interface 206. The device 204 may be available to multiple VMs through multiple device interface, e.g., the device interface 206, and a device interface 208.

A resource arbitration module 203 is arranged to be operated by the hypervisor 202 on the computing platform 200 to coordinate the operations of the device interfaces. When the VM 211 is a trusted VM, the resource arbitration module 203 may be a secure resource arbitration module (SEAM) 203. In some embodiments, a SEAM is an instruction set architecture (ISA) extension to implement the TDX. SEAM is a mode of processor that hosts a resource arbitration software module that: (1) manages resource assignment to trusted domains; and (2) manages the creation, deletion, entry and exit from trust domains. Hence, the SEAM software module is a trusted arbiter between the VMM/TDRM and the TDs.

In embodiments, a device interface, e.g., the device interface 206, may be a physical function, a virtual function, or an assignable device interface (ADI). Furthermore, the device interface 206 may operate in various states, e.g., 3 different states, an UNLOCKED state 231, a LOCKED state 233, and a RUN state 235, according to a state machine 230 as shown in FIG. 2(b). In some other embodiments, there may be more than 3 states, or states called different names. For example, an UNLOCKED state 231 may be referred to as an unlocked state, a LOCKED state 233 may be referred to as a locked state, and a RUN state 235 may be referred to as an operational state. In some embodiments there may be an ERROR state that is entered from RUN or LOCKED state on encountering an error. In the ERROR state the interface may not be operational and may only respond to a protocol message request to stop the interface and move to UNLOCKED state. In detail, the device interface 206 may be placed in the unlocked state 231 as a default state of the device 204, a locked state 233 to prevent changes to be made to the device interface 206, or an operational state, e.g., the RUN state 235, to enable access to device registers of the device 204 by the VM 211 or direct memory access (DMA) from the device 204 to memory address spaces of the VM 211. The device interface 206 includes logic 209 in support of a device management protocol to place the device interface 206 in the unlocked state, the locked state, or the run state that is the operational state. In addition, the various device interface management protocols supported by the logic 209 are to provide a trusted mechanism to report device interface configurations to the VM 211, start the device interface 206 to make it operational, move the device interface 206 into the operational state from the locked state when the device 204 is assigned to the VM 211, and further move the device interface 206 into the unlocked state when removing the device interface 206 from being assigned to the VM 211, stop access by the VM 211 to the device registers of the device 204 and DMA by the device 204 to memory spaces of the VM 211, and stop and clean up the state associated with the device interface 206. Protocol messages are exchanged with the device 204 to move the device interface 206 between these states of the state machine 230. Embodiments herein further present the functional behavior of the device 204 to handle these messages.

In addition, TDX-IO may define extensions to the device security extensions protocol to manage interfaces in the device 204. For example, the single root I/O virtualization (SR-IOV) is an extension of PCIe specification that allows a device, such as a storage adapter, to separate access to its resources among various PCIe hardware functions where the functions could be a physical function (PF) or a virtual function (VF). The PF is the primary function of the device and is usually assigned to the root or parent partition in a virtualized environment. The VF shares one or more physical resources wof the device—such as memory, network port, storage volume, etc.—with the PF and other VFs on the device. A VF is usually assigned to a child partition like a TD in a virtualized environment. To address the scalability issues with SR-IOV, a further PCIe extension has been defined called scalable IOV which provides similar sharing and assignment of device resources to child partitions like a TD but does not require instantiation of virtual functions (VFs) and thereby address the SR-IOV scalability challenges. A device supporting scalable IO virtualization instead defines assignable device interfaces (ADI) that may all be hosted by a given physical function but can be individually assigned to a child partition such as a TD.

In embodiments, when the VM 211 is a trusted VM, e.g., a TD, a device interface, e.g., the device interface 206, may be a unit of device assignment in the TD. The logic 209 in support of the device management protocol is to place the device interface 206 in the unlocked state, the locked state, or the operational state in a secure manner. For example, as shown in FIG. 2(c), at interaction 241, the logic 209 or the security manager 225 is to negotiate a link encryption key with the VM 211 or the SEAM 203 and the device 204 to secure communications between the device 204 and the root port 221 and/or the trusted VM 211. At interaction 242, the SEAM 203 is to provide the link encryption key to the root port 221. At interaction 243, the security manager 225 is to provide the link encryption key to the end point 223. The logic 209 is further to authenticate the device 204 by various operations. At interaction 244, the trusted VM 211 is to obtain an identity and measurements of the device 204. At interaction 245, the trusted VM 211 is to verify the identity and measurements of the device 204. At interaction 246, the trusted VM 211 and the SEAM 203 are to verify the link status for the computer bus 205 and to verify that the secure link has been established by SEAM module with the same device whose identity was verified by TD in interaction 245. The various operations in the interaction 241 to the interaction 246 may be performed before the device interface 206 of the device 204 is assigned to the trusted VM 211. In some embodiments, the interactions 241, 242, 243 may be performed once, while interactions 244, 245, 246 are performed on each trusted device interface assignment. The use of interaction 246 to verify that the link is secured with device whose identity was same as that verified in 245 allows multiple TDs to trust the link security without having to reveal the keys used to secure the link to any of the TDs and thereby allowing the device 204 to be shared among multiple TDs as well as non-TD VMs. When the device interface 206 is in the operational state, the device 204 is to accept trusted transaction level packets (TLPs) from the trusted VM 211 or to generate trusted TLPs to be sent to the trusted VM 211.

In embodiments, the device interface 206 may perform various operations, e.g., according to a process 310 shown in FIG. 3(*a*). For example, at interaction 311, the device interface 206 is to facilitate assignment of the device 204 to the VM 211. At interaction 313, the device interface 206 is to facilitate access of the device 204 by the VM 211. At interaction 315, the device interface 206 is to facilitate removal of the device 204 from being assigned to the VM 211.

In embodiments, when the VM 211 is a trusted VM, more details of the interactions are presented. For example, to facilitate the assignment of the device 204 to the trusted VM 211, the device interface 206 is, at interaction 312, to receive a request to lock the device interface 206 to move the device interface 206 from the default state to the locked state. In addition, the device interface 206 is, at interaction 314, to send to the trusted VM 211 a device interface report when the device interface 206 is in the locked state. In some embodiments, the device interface report may include a nonce which is provided by the trusted VM 211. The nonce ensures that the device interface report is the freshest once. Furthermore, the device interface report contains the details of the configurations locked—e.g. MMIO resources, the order in which the MMIO resources should be mapped into the TD VM, PASID associated with the interface if any, and other device specific information, etc. In some embodiments, the device interface report may include a start interface nonce so that a start request cannot be replayed. The device interface 206 is, at interaction 316, to receive a request to move the device interface 206 to the operational state from the locked state, after the device interface report has been validated by the trusted VM 211. Additional operations may be performed. The device interface 206 is, at interaction 317, to determine memory mapped input-output (MMIO) resources mapping between the trusted VM 211 and the device 204. In detail, the device interface 206 is to determine if the MMIO resources mapped into the VM matches the MMIO resources configuration as reported in the device interface report. The device interface 206 is, at interaction 318, to receive an allocation of the memory address spaces of the trusted VM 211 for the device interface 206 to host the MMIO resources.

In embodiments, to facilitate removal of the device 204 from being assigned to the VM 211, the device interface 206 is, at interaction 321, to stop access by the trusted VM 211 to the device registers of the device 204 and DMA by the device 204 to the memory address spaces of the trusted VM 211. The device interface 206 is, at interaction 322, to remove the device interface 206 from being assigned to the trusted VM 211; and at interaction 323, to remove the MMIO resources assigned to the trusted VM 211. In some embodiments, in response to the STOP operation, the device 204 is to clear any outstanding transactions and scrub any secrets on the device side before providing the stop response such that if that interface were to be later assigned to another TD VM or non-TD VM there would not be any leakage of secrets.

In embodiments, the device driver 214 includes support of a device management protocol to cause the device interface 206 to be placed in a default unlocked state, a locked state to prevent changes to be made to the device interface 206, or an operational state to enable access to device registers of the device 204 by the VM 211 or DMA from the device 204 to memory address spaces of the VM 211. In addition, the device driver 214, in support of the device management protocol, is to receive from the device interface 206 a configuration report of the device interface 206; instruct the device interface 206 to move into the operational state from the locked state when the device 204 is assigned to the VM 211. Furthermore, the device driver 214 may instruct the device interface 206 to move into the unlocked state when removing the device interface 206 from being assigned to the VM 211, thereby stopping access by the VM 211 to the device registers of the device 204 and DMA by the device 204 to memory spaces of the VM 211. When the VM 211 is a trusted VM, the device driver 214 may cause the device interface to be placed in the unlocked state, the locked state, or the operational state in a secure manner.

In detail, the device driver 214 may perform various operations according to a process 330 shown in FIG. 3(*b*). For example, at interaction 331, the device driver 214 is to facilitate assignment of the device interface 206 of the device 204 to the VM 211. At interaction 333, the device driver 214 is to facilitate access of the device 204 by the VM 211. At interaction 335, the device driver 214 is to facilitate removal of the device 204 from being assigned to the VM 211.

In embodiments, when the VM 211 is a trusted VM, more details of the interactions are presented. For example, to facilitate the assignment of the device 204 to the trusted VM 211, the device driver 214 is, at interaction 332, to send a request to lock the device interface 206 to move the device interface 206 from the default state to the locked state. In addition, the device driver 214 is, at interaction 334, to receive from the device interface 206 a device interface report when the device interface 206 is in the locked state. The device driver 214 is, at interaction 336, to validate the device interface report; and at interaction 337, to send a request to move the device interface to the operational state from the locked state after the device interface report has been validated. Additional operations may be performed. The device driver 214 is, at interaction 338, to determine MMIO resources mapping between the trusted VM 211 and the device 204. The device driver 214 is, at interaction 319, to determine an allocation of the memory address spaces of the trusted VM 211 for the device interface 206 to host the MMIO resources.

In embodiments, to facilitate removal of the device 204 from being assigned to the VM 211, the device driver 214 is, at interaction 341, to stop access to the device registers of the device 204. The device driver 214 is, at interaction 343, to stop DMA by the device to the memory address spaces of the trusted VM 211; at interaction 345, to remove the device interface 206 from being assigned to the trusted VM 211; and at interaction 347, to remove the MMIO resources assigned to the trusted VM 211.

In embodiments, the hypervisor 202 may perform various operations, e.g., according to a process 350 shown in FIG. 3(c). For example, at interaction 351, the hypervisor 202 is to manage operations of the VM 211. In addition, at interaction 353, the hypervisor 202 is to facilitate assignment of the device interface 206 of the device 204 to the VM 211. At interaction 355, the hypervisor 202 is to facilitate access of the device 204 by the VM 211. At interaction 357, the hypervisor 202 is to facilitate removal of the device 204 from being assigned to the VM 211.

In embodiments, when the VM 211 is a trusted VM, more details of the interactions are presented. For example, at interaction 352, the hypervisor 202 is to authenticate the device 204 and negotiate a link encryption key to secure communications between the device 204 and the trusted VM 211, before the device interface 206 of the device 204 is assigned to the trusted VM 211. At interaction 354, the hypervisor 202 is to transmit and receive, when the device interface 206 is at the operational state, trusted TLPs between the trusted VM 211 and the device 204. At interaction 356, the hypervisor 202 is to assign another device interface, e.g., the device interface 208, of the device 204 to another trusted VM 213 to move the device interface 208 to the operational state. At interaction 358, the hypervisor 202 is to configure the device interface 206 to be assigned to the VM 211; at interaction 359, the hypervisor 202 is to compose a virtual device (VDEV) backed with the device interface 206; at interaction 361, the hypervisor 202 is to send a request to lock the device interface 206 to move the device interface 206 from the default state to the locked state; at interaction 362, the hypervisor 202 is to receive from the device interface 206 a device interface report when the device interface is in the locked state; and at interaction 363, the hypervisor 202 is to assign the VDEV to the VM 211. In some embodiments, the VM 213 is to provide a nonce and the device 204 is to provide a start nonce.

In embodiments, the resource arbitration module 203 includes support of a device management protocol to cause the device interface 206 to be placed in a default unlocked state, a locked state to prevent changes to be made to the device interface, or an operational state to enable access to device registers of the device 204 by the VM 211 or DMA from the device 204 to memory address spaces of the VM 211. The resource arbitration module 203, in support of the device management protocol, is further to receive from the device interface 206 a configuration report of the device interface 206, instruct the device interface 206 to move into the operational state from the locked state when the device 204 is assigned to the VM 211, and further instruct the device interface 206 to move into the unlocked state when removing the device interface from being assigned to the VM 211, thereby stopping access by the VM 211 to the device registers of the device 204 and DMA by the device 204 to memory spaces of the VM 211.

In embodiments, when the VM 211 is a trusted VM, the resource arbitration module 203, in support of the device management protocol, is to cause the device interface 206 to be placed in the unlocked state, the locked state, or the operational state in a secure manner. In some embodiments, the trusted VM 211 is a first trusted VM, the device interface 206 is a first device interface, the VM 213 is a second trusted VM managed by the hypervisor 202, and the resource arbitration module 203 is further to assign a second device interface, e.g., the device interface 208 of the device 204 to the second trusted VM 213 to move the device interface 208 to the operational state. In some embodiments, the resource arbitration module 203 is to enforce the sequence: block memory of TD from being accessible to the device by unmapping the device access to TD memory, block the TD access to the MMIO registers of the device, require that a STOP interface be issued to the device and verify that the response has been received from the device to the stop interface, only after processing the stop interface response to allow reclaiming the PASID and MMIO resources assigned to the TD such that they may be re-used for assignment to other TDS or non-TD VMs.

In embodiments, resource arbitration module 203 may perform various operations. For example, resource arbitration module 203 is to facilitate assignment of the device 204 to the VM 211, access of the device 204 by the VM 211, and removal of the device 204 from being assigned to the VM 211. The messages between the TD and the device are integrity protected by the use of a shared secret between the trusted VM, the resource arbitration module 203, and the device 204. The resource arbitration module 203 is to provide a way to authenticate the messages to enforce they have not been tampered or replayed. The act of having the resource arbitration module 203 as trusted intermediary such that non given TD can spoof/replay these messages and thereby allowing the device to be shared among multiple TD VMs without any TD VM having to trust any other TD VM.

In some embodiments, when the VM 211 is a trusted VM, e.g., a TD, the hypervisor 202 is a VMM, more detailed operations and messages are presented below to show the operations of the state diagram 230 for the device interface 206, the VM 211, the hypervisor 202, which may simply be referred to as an interface, a TD, and a VMM.

Unlocked

This is the default state of the device interface 206. In the unlocked state, the OS 212 or the VMM configures the device interface 206, e.g., a PF, VF, or ADI, to be assigned to a TD. Once the device interface 206 has been configured, the VMM issues a LOCK_INTERFACE message to the device 204. In response to the LOCK_INTERFACE messages, the device 204 starts tracking the configurations of the device interface 206 for any modifications.

The device 204 may lock the firmware digests in response to the first LOCK_INTERFACE message. All subsequent firmware updates may be reflected in a new digest register that reports late loaded firmware or alternately the device may stop accepting new firmware when there is at least one interface in locked state.

Locked

The device 204 is tracking the device interface 206 for changes in the locked state and any changes detected are treated as an error. As part of transitioning the device interface to LOCKED state, the device 204 may assign additional private resources to the device interface 206. For example, the LOCK_INTERFACE can be a trigger for the device 204 to assign and configure memory encryption keys for device side memories.

If any untrusted accesses—read, write, enqueue, etc.— (transactions without SEC_STREAM.trusted bit set or transactions without the SEC_STREAM header) are detected to the locked interface registers, then the device generates UR response.

Once the VMM has moved the interface to the LOCKED state, it can now offer this interface to the TD. The TD may request a report of this interface from the device (through the VMM). The device may be requested to generate a report for the interface through a DEVICE_INTERFACE_REPORT request message when the interface is in locked state.

Once the TD has verified the device interface report, obtained and verified attestations from the device, and accepted the resources assigned to the interface (MMIO pages, Process Address Space ID (PASID), etc.), it may request the interface to be moved to RUN state by requesting the VMM to send the START_INTERFACE message to the device.

Run

In RUN state, the interface is operational. The device can accept trusted transaction level packets (TLPs) and can generate trusted TLP in this state.

The device is tracking the interface for changes in the RUN state and any changes detected are treated as an error.

If any untrusted accesses—read, write, enqueue, etc.— (transactions without SEC_STREAM.trusted bit set or transactions without the SEC_STREAM header) are detected to the locked interface registers, then the device generates UR response.

Receiving GET_DEVICE_INTERFACE_REPORT request in RUN state is legal. The device should generate the response as appropriate.

In the LOCKED and RUN state, following conditions are treated as errors and the interface moves to UNLOCK state on detecting these errors: (1) Reprogramming device BARs, (2) Resetting device/function/interface, (3) Link security break—MAC failures, etc., (4) UR or UC response from SOC in response to a Trusted transaction, and (5) Other device specific conditions or changes in configuration that affect trust properties. Alternately, the device may move to an ERROR state wherein it will move to UNLOCKED state only on receipt of a STOP_INTERFACE message.

When the device interface transitions back to UNLOCKED state in response to an error, it may ensure that all private data held by the device in the context of that interface is scrubbed and cannot be accessed by untrusted entities.

device by the SEAM module. The protocol for secure key negotiation is being developed at DMTF as an extension to the PCIe device security extensions. The use of MAC allows these messages to be sent via the untrusted VMM but any tampering of the messages by the VMM will be detected.

Lock_Interface_Request

The LOCK_INTERFACE_REQUEST is used to move the interface into a LOCKED state. The interface is identified by the combination of INTERFACE_ID and REQUESTER_ID. For PF/VF interfaces the INTERFACE_ID is always 0. For dedicated or shared work queues hosted by a device function, the INTERFACED uniquely identifies the work queue being locked.

| Offset | | Size | Value |
|---|---|---|---|
| Header | | | |
| 0 | ProtocolVersion | 1 | TBA |
| 1 | MessageType | 1 | LOCK_INTERFACE_REQUEST |
| 2 | Param1 | 1 | Reserved |
| 3 | Param2 | 1 | Reserved |
| Payload (All fields in little endian format) | | | |
| 4 | INTERFACE_ID | 8 | Interface to lock and track |
| | REQUESTER_ID | 2 | Requester ID of the device function hosting the interface |

The device may generate an ERROR response if LOCK_INTERFACE_REQUEST could not be processed due to one or more of the fields of the request being invalid, if the protocol version is unsupported, if the device cannot process the request due to being busy, or due to an unspecified reason, or other vendor specific reasons.

If the request to lock the interface was successful, then then device responds with a LOCK_INTERFACE_RESPONSE message.

Lock_Interface_Response

The LOCK_INTERFACE_RESPONSE is provided on successful handling of the LOCK_INTERFACE_REQUEST and the device having moved the interface specified into the LOCKED state. The response message also provides a START_INTERFACE_NONCE that is generated when the interface is locked. This nonce should be generated by the device in response to moving the interface to LOCKED state and stays valid in the run state. This nonce is destroyed when the interface moves to unlocked state.

| Offset | Field | Size | Value |
|---|---|---|---|
| Header | | | |
| 0 | ProtocolVersion | 1 | TBA |
| 1 | MessageType | 1 | LOCK_INTERFACE_RESPONSE |
| 2 | Param1 | 1 | Reserved |
| 3 | Param2 | 1 | Reserved |
| Payload (All fields in little endian format) | | | |
| 4 | START_INTERFACE_NONCE | 32 | Device generated nonce to include in START_INTERFACE message. |

Device Interface Management Messages

Some of the messages described in this section have a MAC associated with them to ensure the integrity of the message. This key used to generate the MAC is a secret between the SEAM module and the device. This secret is established as part of the key negotiation done with the Get_Device_Interface_Report The GET_DEVICE_INTERFACE_REPORT is used to request a DEVICE_INTERFACE_REPORT from the device. One field of the report is the MMIO addresses that are decoded by the device interface. The TD is the consumer of this report but physical addresses must not be exposed to a TD as that would be a virtualization hole as well as information leakage. To avoid this, the request carries a MMIO reporting base and the device reports physical addresses of the MMIO pages of the interface as an offset against this reporting base. This base is configured to be the lowest address of the MMIO range register which is used to select the key for encryption MMIO transactions to this device. To protect the integrity of the MMIO reporting base, this message is an authenticated message with a MAC.

The device generates an ERROR response if LOCK_INTERFACE_REQUEST could not be processed due to one or more of the fields of the request being invalid, if the protocol version is unsupported, if the device cannot process the request due to being busy, due to the interface not being in LOCKED or RUN state, due to an unspecified reason, or other vendor specific reasons.

| Offset | Field | Size | Value |
|---|---|---|---|
| | | Header | |
| 0 | ProtocolVersion | 1 | TBA |
| 1 | MessageType | 1 | GET_DEVICE_INTERFACE_REPORT |
| 2 | Param1 | 1 | Reserved |
| 3 | Param2 | 1 | Reserved |
| | Payload (All fields in little endian format) | | |
| 4 | INTERFACE_ID | 8 | Interface to report |
| | REQUESTER_ID | 2 | Requester ID of the device function hosting the interface |
| | REPORT_INTERFACE_NONCE | 32 | Random 32-byte nonce chosen by the TD |
| | MMIO_REPORTING_BASE | 8 | MMIO ranges reported in DEVICE_INTERFACE_REPORT are reported as offsets from this MMIO reporting base |
| | MESSAGE_MAC_IV | 12 | IV used to compute message MAC |
| | MESSAGE_MAC | 16 | GMAC on the SHA384 HASH of the message payload excluding MESSAGE_MAC_IV, and MESSAGE_MAC using session MAC key |

Device_Interface_Report

| Offset | Field | Size | Value |
|---|---|---|---|
| | | Header | |
| 0 | ProtocolVersion | 1 | TBA |
| 1 | MessageType | 1 | DEVICE_INTERFACE_REPORT |
| 2 | Param1 | 1 | Reserved |
| 3 | Param2 | 1 | Reserved |
| | Payload (all fields in little endian format) | | |
| 4 | PAYLOAD_LENGTH | 4 | Length in Bytes |
| | INTERFACE_ID | 8 | ID of interface |
| | REQUESTER_ID | 2 | Requester ID of the device function hosting the interface |
| | PASID | 4 | If the interface is statically configured with a PASID then it is included in the report else the valid bit is not set. Bit 31: VALID Bit 19:0: PASID |
| | INTERFACE_STATUS | 1 | Interface status 0 - LOCKED 1 - RUN |
| | REPORT_INTERFACE_NONCE | 32 | Random 32-byte nonce from DEVICE_INTERFACE_REPORT request |
| | MMIO_RANGE_COUNT (N) | 4 | Number of MMIO Ranges in report |
| | MMIO_RANGE | N * 16 | Each MMIO Range mapped to the interface is reported as offsets from the MMIO range reporting base and size in pages 8 bytes - Offset of first 4K page from MMIO reporting |

-continued

| Offset | Field | Size | Value |
|---|---|---|---|
| | | | base |
| | | | 4 bytes - Number of 4K pages in this range |
| | | | 4 bytes - Range Attributes |
| | | | Bit 0 - Shareable - is sharing safe (e.g. Shared work queue) |
| | DEVICE_SPECIFIC_INF_O_LEN (L) | 4 | Number of bytes of device specific information |
| | DEVICE_SPECIFIC_INFO | L | Device specific information |
| | MESSAGE_MAC_IV | 12 | IV used to compute message MAC |
| | MESSAGE_MAC | 16 | GMAC on the SHA384 HASH of the message payload excluding MESSAGE_MAC_IV, and MESSAGE_MAC using session MAC key |

Start_Interface_Request

The START_INTERFACE_REQUEST carries the interface ID of the interface along with the RID of the function hosting the interface and optionally the PASID.

If the interface ID specified in the start interface is not hosted by the function identified by the RID in the request then this is treated as an error and the device should fail the request.

If the interface is statically configured with a PASID (e.g. dedicated work queue) then the device must fail the start interface request if: (1) PASID specified in start interface is not valid; (2) PASID specified in start interface is valid but does not match the statically configured PASID in the device interface.

If the interface is not statically configured with a PASID (e.g. shared work queue, PASID not enabled, etc.) then specifying a valid PASID in the start interface request is treated as an error by the device.

If none of these errors are encountered, the device prepares to transition the referenced interface into a trusted state i.e. RUN state if the nonce in the request matches the nonce created for this interface when it was moved to locked state.

START_INTERFACE_REQUEST can be issued only if the interface is in a LOCKED state. The device shall generate an ERROR response treating the parameters as invalid if the interface is not in LOCKED state.

Moving the interface to RUN state may involve device side actions like enabling device side memory encryption, etc. If all resource assignments and device side configurations needed to move the interface are successfully completed, then the interface is moved into the RUN state. The device can start generating and accepting transactions with SEC_STREAM.Trusted=1 once it has accepted the START_INTERFACE_REQUEST message and moved the interface to RUN state.

The device generates an ERROR response if START_INTERFACE_REQUEST could not be processed due to one or more of the fields of the request being invalid, if the protocol version is unsupported, if the device cannot process the request due to being busy, due to the interface not being in LOCKED state, due to an unspecified reason, or other vendor specific reasons.

| Offset | Field | Size | Value |
|---|---|---|---|
| | Header | | |
| 0 | ProtocolVersion | 1b | TBA |
| 1 | MessageType | 1 | START_INTERFACE_REQUEST |
| 2 | Param1 | 1 | Reserved |
| 3 | Param2 | 1 | Reserved |
| | Payload | | |
| 4 | INTERFACE_ID | 8 | Interface to start |
| | REQUESTER_ID | 2 | Requester ID of the device function hosting the interface |
| | PASID | 4 | If the interface is statically configured with a PASID then it is included else VALID bit is not set. Bit 31: VALID Bit 19:0: PASID |
| | START_INTERFACE_NONCE | 32 | Device generated nonce for message (from LOCK_INTERFACE_RESPONSE) |
| | MESSAGE_MAC_IV | 12 | IV used to compute message MAC |
| | MESSAGE_MAC | 16 | GMAC on the SHA384 HASH of the message payload excluding MESSAGE_MAC_IV, and MESSAGE_MAC |

| Offset | Field | Size | Value |
|---|---|---|---|
| | | | using session MAC key |

Stop_Interface_Request

The STOP_INTERFACE_REQUEST carries the interface ID assigned by the device to the interface along with the RID of the function hosting the interface and optionally the PASID. The PASID is specified when the device is PASID enabled.

The device generates an ERROR response if STOP_INTERFACE_REQUEST could not be processed due to one or more of the fields of the request being invalid, if the protocol version is unsupported, if the device cannot process the request due to being busy, due to an unspecified reason, or other vendor specific reasons.

In response to the STOP_INTERFACE command following actions are performed:

If device is PASID enabled, identify all interfaces that are associated with the specified RID and specified PASID. If PASID was not specified in the STOP_INTERFACE_REQUEST then all interfaces associated with the specified RID are identified.

If device is not PASID enabled, identify all interfaces that are associated with the specified RID.

For each of the identified interfaces, the following operations may be performed. If the interface is PASID enabled then: abort any work that is being performed in the context of the interface for the specified PASID, wait for any outstanding responses for the aborted work, invalidate any device side translations created for the specified PASID, scrub internal state of the device to remove any secrets associated with the specified PASID—such that those secrets will not be accessible if this PASID were to be assigned to another domain. If a valid PASID was not specified then scrub all secrets associated with the interface.

On the other hand, if the interface is not PASID enabled then: abort any work that is being performed in the context of the interface, wait for any outstanding responses for the aborted work, invalidate any device side translations created for the interface, scrub internal state of the device to remove any secrets associated with the interface—such that those secrets will not be accessible if this interface were to be assigned to another domain. If the interface is not a shared work queue then transition the interface to UNCONFIG state such that the device will no longer generate any transactions with SEC_STREAM.trusted=1 on this interface.

Device generates the STOP_INTERFACE_RESPONSE once these actions are completed.

| Offset | Field | Size | Value |
|---|---|---|---|
| | Header | | |
| 0 | ProtocolVersion | 1 | TBA |
| 1 | MessageType | 1 | STOP_INTERFACE_REQUEST |
| 2 | Param1 | 1 | Reserved |
| 3 | Param2 | 1 | Reserved |
| | Payload | | |
| | REQUESTER_ID | 2 | Requester ID of the device function hosting the interface |
| | PASID | 4 | Bit 31: VALID<br>Bit 19:0: PASID |
| | STOP_INTERFAC_NONCE | 32 | Host generated nonce |
| | MESSAGE_MAC_IV | 12 | IV used to compute message MAC |
| | MESSAGE_MAC | 16 | GMAC on the SHA384 HASH of the message payload excluding MESSAGE_MAC_IV, and MESSAGE_MAC using session MAC key |

Stop_Interface_Response

| Offset | Field | Size | Value |
|---|---|---|---|
| | Header | | |
| 0 | ProtocolVersion | 1 | TBA |
| 1 | MessageType | 1 | STOP_INTERFACE_RESPONSE |
| 2 | Param1 | 1 | Reserved |
| 3 | Param2 | 1 | Reserved |

-continued

| Offset | Field | Size | Value |
|---|---|---|---|
| | | Payload | |
| 4 | REQUESTER_ID | 2 | Requester ID of the device function hosting the interface |
| | PASID | 4 | Bit 31: VALID<br>Bit 19:0: PASID |
| | STOP_INTERFACE_NONCE | 32 | Host generated nonce - returned in the response |
| | MESSAGE_MAC_IV | 12 | IV used to compute message MAC |
| | MESSAGE_MAC | 16 | GMAC on the SHA384 HASH of the message payload excluding MESSAGE_MAC_IV, and MESSAGE_MAC using session MAC key |

FIGS. 4-8 illustrate example state diagrams for device interface assignment flow, in accordance with various embodiments. Operations illustrated in FIGS. 4-8 are detailed implementations for the interaction 311, the interaction 331, and the interaction 353, in example processes shown in FIGS. 3(a)-3(c), which are for managing device interfaces performed by a device interface, a VM, and a hypervisor.

Device Interface Assignment Flows—

The following provide descriptions on how the VMM uses the protocol and messages disclosed so far to do device interface assignment and removal from TDs.

Device Interface Assignment

Device interface assignment involves following steps: (1) Configuring and locking the interface using LOCK_INTERFACE_REQUEST; (2) Obtaining a DEVICE_INTERFACE_REPORT using GET_DEVICE_INTERFACE_REPORT: (3) Verifying the configuration reported by the device in DEVICE_INTERFACE_REPORT; (4) If configurations are acceptable then accept the MMIO and DMA mappings to enable access to the device registers and to enable DMA from device to TD memory; and (5) If the configurations are acceptable then starting the interface using START_INTERFACE_REQUEST Step 1: Configure and Lock Interface—

Figure 4:
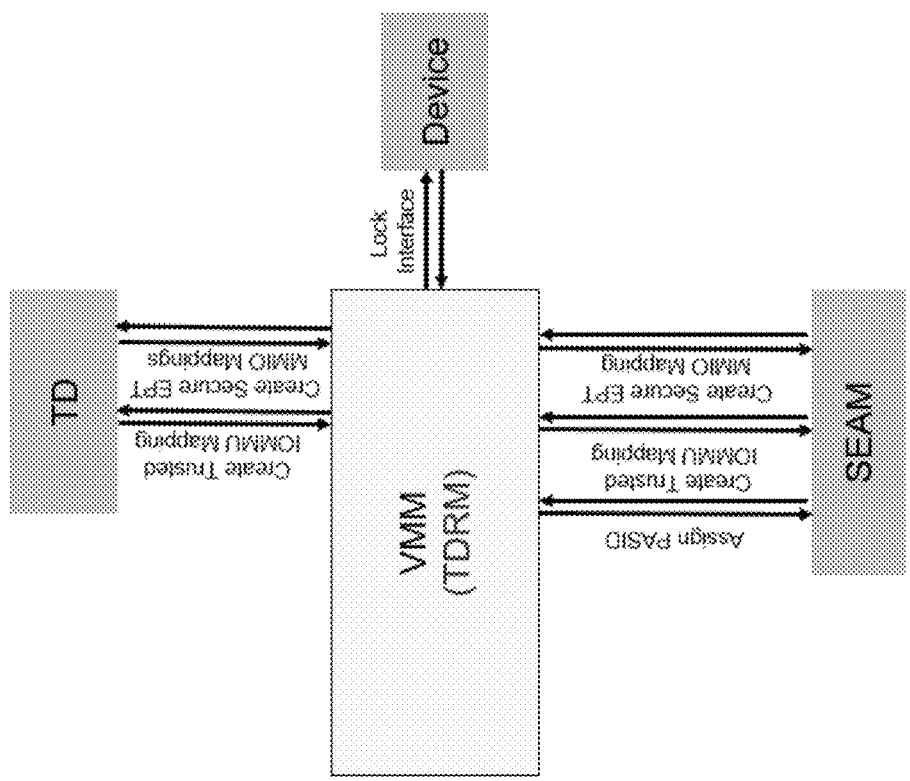
FIGS. 4-8 illustrate example state diagrams for device interface assignment flow, in accordance with various embodiments.

FIG. 4 illustrates Step 1. VMM allocates a PASID and requests SEAM to assign PASID ownership to the TD. SEAM updates its internal tracking structures and adds a mapping in PASID translation structure in a pending (configured, but not present) state. VMM composes a virtual device (VDEV) representing one or more device interfaces. Device interface could be a PCIe physical function, a PCIe SR-IOV virtual function, or a Scalable IOV assignable device interface. For each interface associated with a VDEV, VMM configures the device interface, executes LOCK_INTERFACE_REQUEST method on the device, and receives LOCK_INTERFACE_RESPONSE. VMM assigns VDEV to TD. TD enumerates VDEV and discovers different capabilities. TD requests creation of Trusted IOMMU mapping/s for the VDEV, resulting in VMM invoking SEAM to create the mapping/s in a pending (configured, but not present) state. TD allocates GPA space for hosting MMIO resources of the VDEV, and requests VMM to map MMIO resources for the VDEV (provides it the GPA ranges). For each MMIO page to be mapped to the TD, VMM requests SEAM to create a Secure EPT mapping, providing it the required settings (e.g. shared or private MMIO page mapping), for associating GPA with a corresponding HPA. SEAM checks to ensure that MMIO page is not already mapped (if private mapping is requested), configures the ownership and settings for the page, and creates the mapping in Secure EPT in a pending (configured, but not present) state.

Step 2: Obtain DEVICE_INTERFACE_REPORT—

Figure 5:
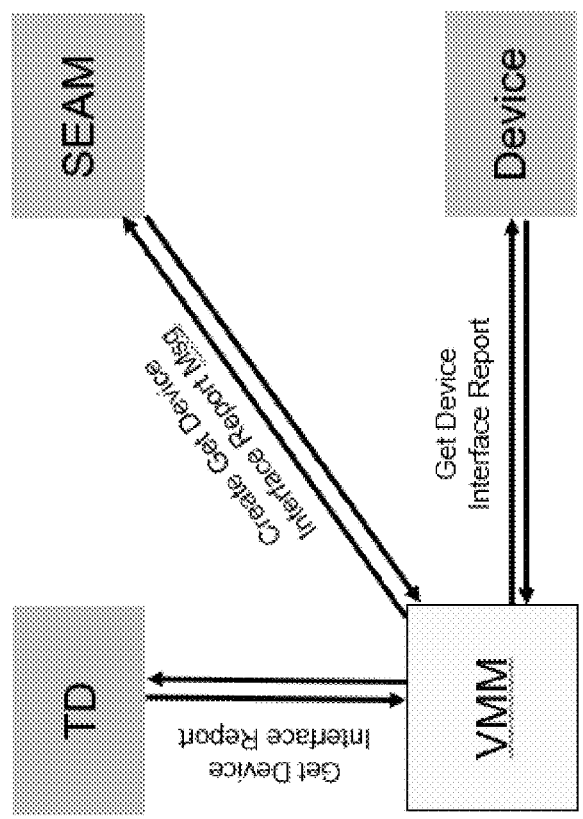

FIG. 5 illustrates Step 2. TD requests VMM to get a DEVICE_INTERFACE_REPORT for each device interface associated with the VDEV (provides it the nonce/s). For each device interface associated with VDEV, VMM requests SEAM to create a GET_DEVICE_INTERFACE_REPORT message, provides it the RID, PASID, interface ID, and the nonce received from the TD. For each device interface, VMM executes GET_DEVICE_INTERFACE_REPORT method on the device, and generates a DEVICE_INTERFACE_REPORT. VMM returns DEVICE_INTERFACE_REPORT/s received from the device to the TD for it to validate.

Step 3: Verify DEVICE_INTERFACE_REPORT—

Figure 6:
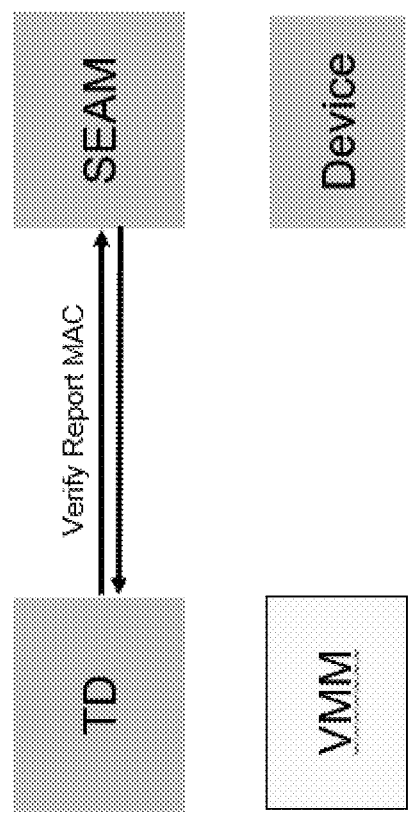

FIG. 6 illustrates Step 3. For each DEVICE_INTERFACE_REPORT, TD validates nonce in the report against the nonce sent to the VMM while requesting a report to ensure freshness of the report (to prevent against anti-reply attacks). TD validates the contents of the report (e.g. RID, PASID etc.). Since the DEVICE_INTERFACE_REPORT was passed through untrusted entities, TD needs to ensure that its contents are valid and have not been tempered with. TD generates hash for the report and requests SEAM to verify it against the MAC received inside the report (to prevent against man-in-the-middle attacks). If any of the checks fail, the DEVICE_INTERFACE_REPORT is marked invalid and assignment process is abandoned for the given VDEV.

Step 4: Accept MMIO and DMA mappings—

Figure 7:
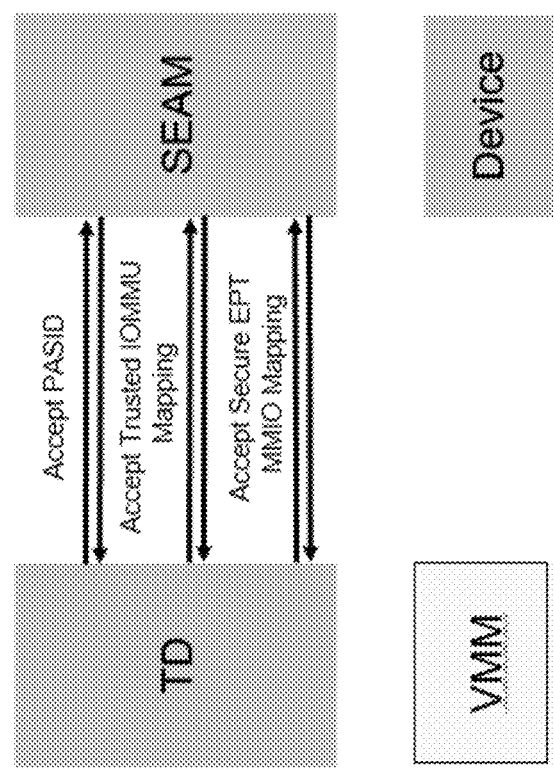

FIG. 7 illustrates Step 4. TD requests SEAM to accept (or activate) PASID. SEAM validates the PASID ownership and validates PASID translation before activating it. TD requests SEAM to accept (or activate) Trusted IOMMU mapping/s—providing it the RID, PASID, and optionally FLPTR along with the desired IOMMU settings (e.g. DevTLB enable, page-request enable etc.). SEAM validates PASID ownership, validates IOMMU configuration against the desired IOMMU settings, and validates the translation and ownership of translation before activating it. If a valid FLPTR was provided, IOMMU mapping is activated as a nested-translation. For each MMIO page, TD requests SEAM to accept (or activate) Secure EPT MMIO mapping—providing it the GPA, desired Secure EPT settings (e.g. shared or private MMIO page mapping), and an MMIO offset information received in the DEVICE_INTERFACE_REPORT. SEAM calculates HPA based on the configured/stored MMIO base and the offset passed, validates ownership and settings for the page, validates GPA-HPA translation, and then finally activates the mapping.

Step 5: Start the Interface to Move it to RUN State—

Figure 8:
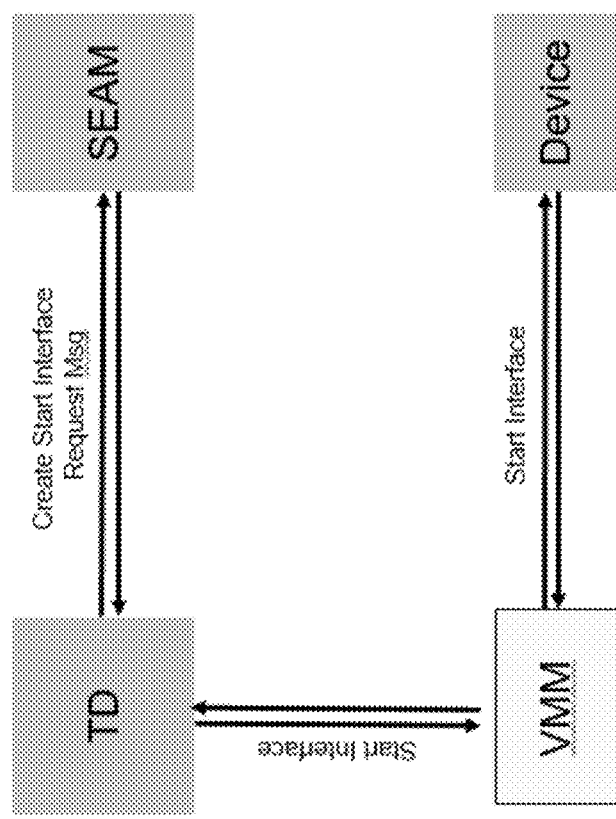

FIG. 8 illustrates Step 5. For each device interface associated with VDEV, TD validates device interface configuration and requests SEAM to create a START_INTERFACE_REQUEST message—provides it the RID, PASID, interface ID, and nonce received in LOCK_INTERFACE_RESPONSE. TD requests VMM to start device interface/s. VMM executes START_INTERFACE_REQUEST method on the device for requested device interface/s, moving it/them to "Run" state if not already—provides it the START_INTERFACE_REQUEST message received from the TD. VMM notifies TD about the completion of the start interface request. Device interface can only accept or generate trusted transactions when in the "Run" state.

Figure 9:
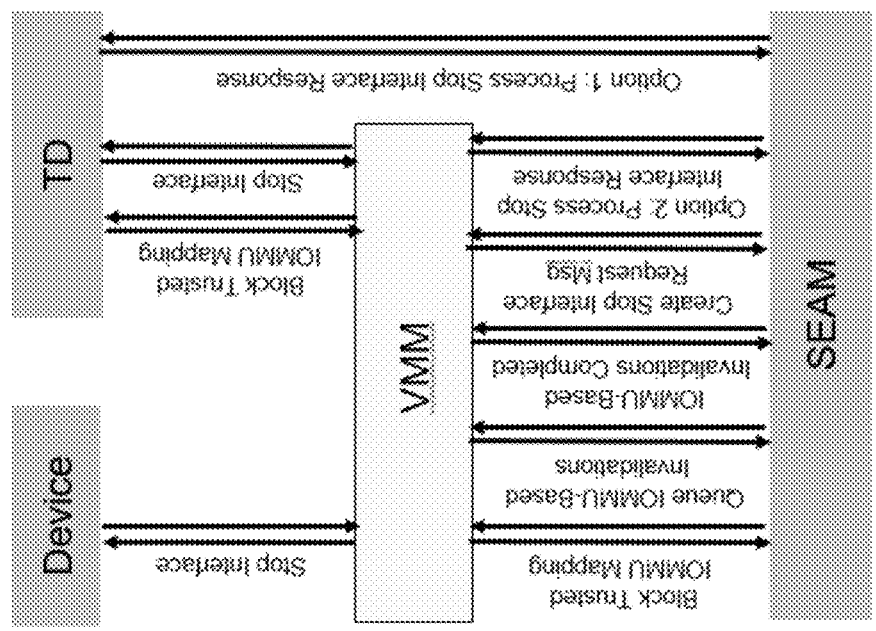
FIGS. 9-11 illustrate example state diagrams for device interface removal flow, in accordance with various embodiments.
Figure 10:
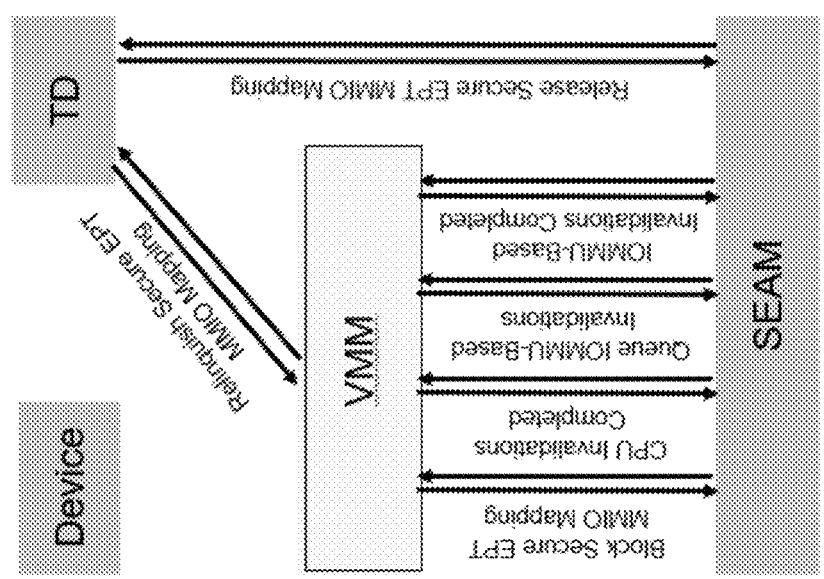
Figure 11:
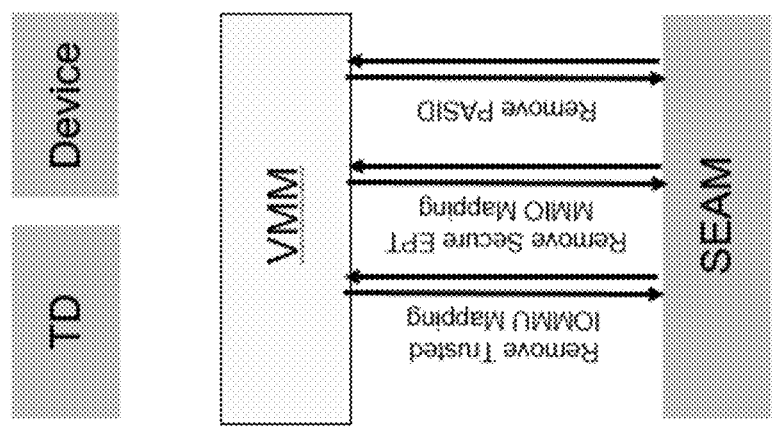

FIGS. 9-11 illustrate example state diagrams for device interface removal flow, in accordance with various embodiments. Operations illustrated in FIGS. 9-11 are detailed implementations for the interaction 315, the interaction 335, and the interaction 357, in example processes shown in FIGS. 3(*a*)-3(*c*), which are for managing device interfaces performed by a device interface, a VM, and a hypervisor.

Device Interface Removal

Device interface removal involves three steps: (1) Block DMA mapping to disable DMA from the device to TD memory and Issue a STOP_INTERFACE_REQUEST to the device; (2) On successful completion of the STOP_INTERFACE_REQUEST, relinquish MMIO access to the device, and (3) remove the MMIO and PASID resources assigned to the TD.

Step 1: Block DMA Mapping and Clean Device Interface—

FIG. 9 illustrates Step 1. TD requests VMM to block Trusted IOMMU mapping, resulting in VMM invoking SEAM to block Trusted IOMMU mapping. SEAM deactivates the mapping (i.e. clears the present bit) and marks it to have a flush pending. VMM requests SEAM to queue invalidations associated with the Trusted IOMMU mapping, resulting in the mapping marked for flush started. VMM notifies SEAM for completion of queued invalidations, resulting in the mapping marked for flush completed. TD requests VMM to stop all the interfaces associated with VDEV, provides it a nonce. VMM requests SEAM to create a STOP_INTERFACE_REQUEST message, provides it the RID, PASID, and the nonce received from the TD. SEAM creates the STOP_INTERFACE_REQUEST message, after validating RID and PASID against Trusted IOMMU state, and returns the message to VMM. In some embodiments, SEAM creates its own nonce and embeds it in STOP_INTERFACE_REQUEST. In some embodiments, SEAM keeps a record of nonce embedded in the STOP_INTERFACE_REQUEST message to be able to validate the freshness of STOP_INTERFACE_RESPONSE when the processing is requested. VMM executes STOP_INTERFACE_REQUEST method on the device, cleaning up the state associated with the RID (and PASID if specified), and receives STOP_INTERFACE_RESPONSE from the device. VMM provides STOP_INTERFACE_RESPONSE to the TD. In some embodiments, VMM requests SEAM to process STOP_INTERFACE_RESPONSE received from the device. TD validates nonce in the response, and requests SEAM to process the STOP_INTERFACE_RESPONSE to determine the authenticity of the response. In some embodiments, successful processing of STOP_INTERFACE_RESPONSE results in IOMMU mapping marked for cleanup completed. It should be appreciated that, in some embodiments, some of these operations can be re-arranged or combined. For example, in some embodiments, the device interface is stopped first before the Trusted IOMMU mapping is blocked. For example, in some embodiments, SEAM queues IOMMU invalidations just after blocking the Trusted IOMMU mapping.

Step 2: Relinquish MMIO Mapping—

FIG. 10 illustrates Step 2. On successful completion of the STOP_INTERFACE_REQUEST, TD starts the process of relinquishing MMIO mappings. For each MMIO page, TD requests SEAM to release Secure EPT MMIO mapping, providing it a GPA. SEAM performs GPA-HPA translation, validates ownership for the page, and marks the page as released by TD. TD requests VMM to remove MMIO mappings associated with the VDEV. For each MMIO page, VMM requests SEAM to block MMIO mapping in the Secure EPT. SEAM ensures that TD has released the page or TD is stopped and all PASIDs have been removed from this stopped TD. SEAM deactivates the mapping (i.e. clears the present bit) and marks the page for CPU and IOMMU-based invalidations pending. VMM performs CPU TLB invalidation, and notifies SEAM about the completion. VMM requests SEAM to queue IOMMU-based invalidations associated with the Secure EPT change. VMM notifies SEAM about the completion of IOMMU-based invalidations. Finally, VMM notifies TD about the completion MMIO mappings removal. It should be appreciated that, in some embodiments, some of these operations can be combined. For example, SEAM can queue IOMMU-based invalidations just after changing Secure EPT mapping.

Step 3: Remove Resources Assigned to the Device Interface—

FIG. 11 illustrates Step 3. VMM requests SEAM to remove Trusted IOMMU mapping. SEAM ensures that cleanup is completed for the Trusted IOMMU mapping, before it can be removed. For each MMIO page, VMM requests SEAM to remove the MMIO mapping in the Secure EPT. SEAM ensures that, Secure EPT mapping is in a blocked state, CPU and IOMMU-based invalidation are completed for the mapping. VMM requests SEAM to remove PASID mapping. SEAM ensures that PASID is not being referenced by IOMMU structures, removes PASID translation mapping, and updates internal tracking structures for the PASID removal.

Figure 12:
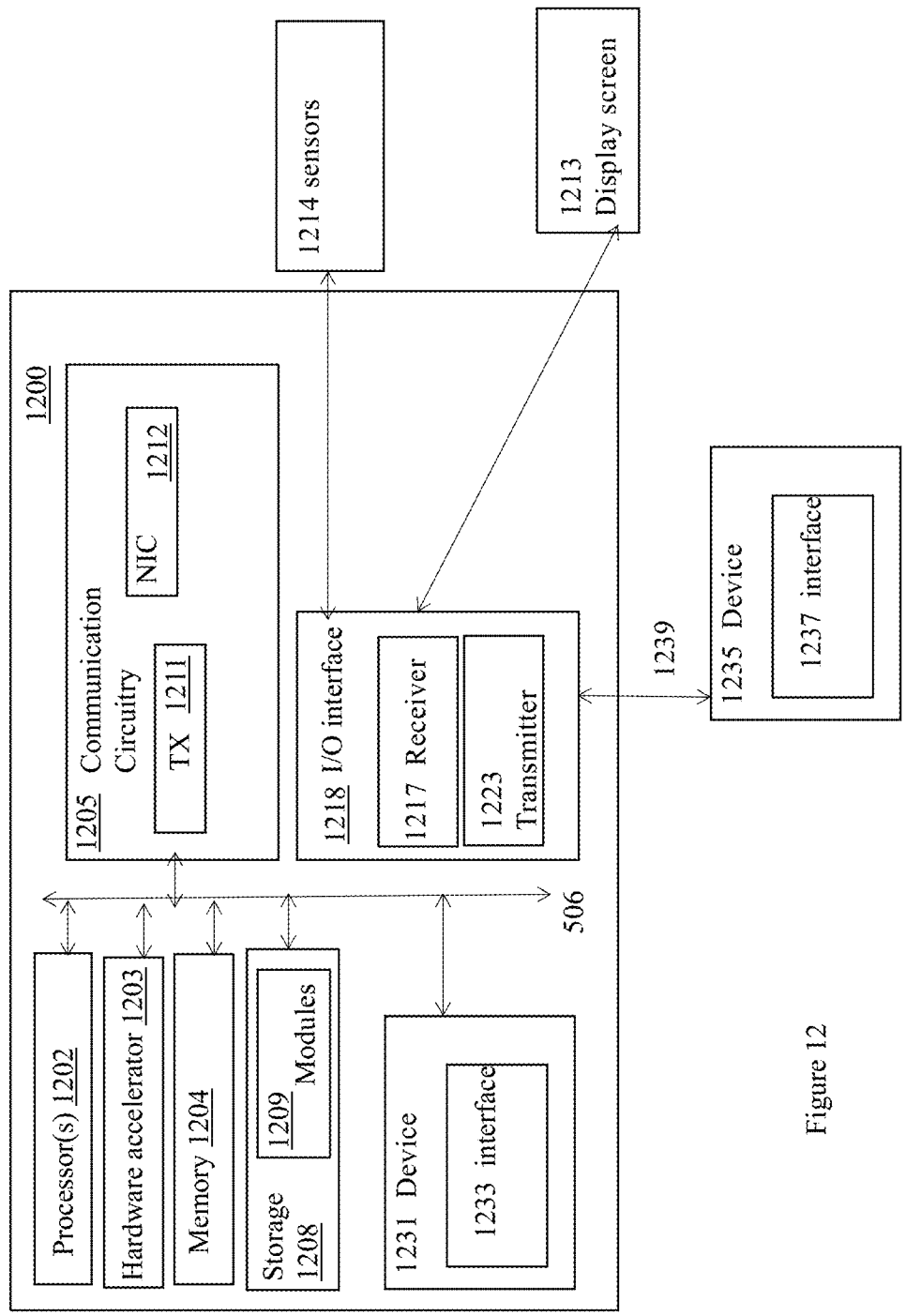
FIG. 12 illustrates an example device suitable for use to practice various aspects of the present disclosure, in accordance with various embodiments.

FIG. 12 illustrates an example device suitable for use to practice various aspects of the present disclosure, in accordance with various embodiments. The device 1200 may be used to implement functions of the apparatus 100. As shown, the device 1200 may include one or more processors 1202, each having one or more processor cores, or and optionally, a hardware accelerator 1203 (which may be an ASIC or a FPGA). In alternate embodiments, the hardware accelerator 1203 may be part of processor 1202, or integrated together on a SOC. Additionally, the device 1200 may include a memory 1204, which may be any one of a number of known persistent storage medium, and a data storage circuitry 1208 including modules 1209. In addition, the 1200 may include an I/O interface 1218, coupled to one or more sensors 1214, and a display screen 1213.

The I/O interface 1218 may include a transmitter 1223 and a receiver 1217. Furthermore, the device 1200 may include communication circuitry 1205 including a transceiver (Tx) 1211, and network interface controller (NIC) 1212. The elements may be coupled to each other via system bus 1206, which may represent one or more buses. In the case of multiple buses, they may be bridged by one or more bus bridges (not shown). A device 1231 may be coupled to the system bus 1206, and a device 1235 may be coupled to a computer bus 1239. The device 1231 may include an interface 1233, and the device 1235 may include an interface 1237. In embodiments, the computer bus 1206 or the computer bus 1239 may be an example of the computer bus 105 as shown in FIG. 1.

In embodiments, the processor(s) 1202 (also referred to as "processor circuitry 1202") may be one or more processing elements configured to perform basic arithmetical, logical, and input/output operations by carrying out instructions. Processor circuitry 1202 may be implemented as a stand-alone system/device/package or as part of an existing system/device/package. The processor circuitry 1202 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 1202 may be a part of a SoC in which the processor circuitry 1202 and other components discussed herein are formed into a single IC or a single package. As examples, the processor circuitry 1202 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 1202 may include a sensor hub, which may act as a coprocessor by processing data obtained from the one or more sensors 1214. The sensor hub may include circuitry configured to integrate data obtained from each of the one or more sensors 1214 by performing arithmetical, logical, and input/output operations. In embodiments, the sensor hub may capable of timestamping obtained sensor data, providing sensor data to the processor circuitry 1202 in response to a query for such data, buffering sensor data, continuously streaming sensor data to the processor circuitry 1202 including independent streams for each sensor of the one or more sensors 1214, reporting sensor data based upon predefined thresholds or conditions/triggers, and/or other like data processing functions.

In embodiments, the memory 1204 (also referred to as "memory circuitry 1204" or the like) may be circuitry configured to store data or logic for operating the computer device 1200. The memory circuitry 1204 may include number of memory devices may be used to provide for a given amount of system memory. As examples, the memory circuitry 1204 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 1204 may include one or more mass-storage devices, such as a solid state disk drive (SSDD); flash memory cards, such as SD cards, microSD cards, xD picture cards, and the like, and USB flash drives; on-die memory or registers associated with the processor circuitry 1202 (for example, in low power implementations); a micro hard disk drive (HDD); three dimensional cross-point (3D)(POINT) memories from Intel® and Micron®, etc.

Where FPDs are used, the processor circuitry 1202 and memory circuitry 1204 (and/or data storage circuitry 1208) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 1202 to implement various logic functions. The memory cells may include any combination of various levels of memory/storage including, but not limited to, EPROM, EEPROM, flash memory, SRAM, antifuses, etc.

In embodiments, the data storage circuitry 1208 (also referred to as "storage circuitry 1208" or the like), with shared or respective controllers, may provide for persistent storage of information such as modules 1209, operating systems, etc. The data storage circuitry 1208 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 1202; hard disk drives (HDDs); micro HDDs; resistance change memories; phase change memories; holographic memories; or chemical memories; among others. As shown, the data storage circuitry 1208 is included in the computer device 1200; however, in other embodiments, the data storage circuitry 1208 may be implemented as one or more devices separated from the other elements of computer device 1200.

In some embodiments, the data storage circuitry 1208 may include an operating system (OS) (not shown), which may be a general purpose operating system or an operating system specifically written for and tailored to the computer device 1200. The OS may include one or more drivers, libraries, and/or application programming interfaces (APIs), which provide program code and/or software components for modules 1209 and/or control system configurations to control and/or obtain/process data from the one or more sensors 1214.

The modules 1209 may be software modules/components used to perform various functions of the computer device 1200 and/or to carry out functions of the example embodiments discussed herein. In embodiments where the processor circuitry 1202 and memory circuitry 1204 includes hardware accelerators (e.g., FPGA cells, the hardware accelerator 1203) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 1209 may comprise logic for the corresponding entities discussed with regard to the display screen 1213, the transmitter 1223, and the receiver 1217.

The components of computer device 1200 may communicate with one another over the bus 1206. The bus 1206 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 1206 may be a controller area network (CAN) bus system, a Time-Trigger Protocol (TTP) system, or a FlexRay system, which may allow various devices (e.g., the one or more sensors 1214, etc.) to communicate with one another using messages or frames.

The communications circuitry 1205 may include circuitry for communicating with a wireless network or wired network. For example, the communication circuitry 1205 may include transceiver (Tx) 1211 and network interface controller (NIC) 1212. Communications circuitry 1205 may include one or more processors (e.g., baseband processors, modems, etc.) that are dedicated to a particular wireless communication protocol.

NIC 1212 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 1212 may be included to allow connect to a second network (not shown) or other devices, for example, a first NIC 1212 providing communications to the network over Ethernet, and a second NIC 1212 providing communications to other devices over another type of network, such as a personal area network (PAN) including a personal computer (PC) device. In some embodiments, the various components of the device 1200, such as the one or more sensors 1214, etc. may be connected to the processor(s) 1202 via the NIC 1212 as discussed above rather than via the I/O circuitry 1218 as discussed infra.

The Tx 1211 may include one or more radios to wirelessly communicate with a network and/or other devices. The Tx 1211 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 1200. In some embodiments, the various components of the device 1200, such as the one or more sensors 1214, etc. may be connected to the device 1200 via the Tx 1211 as discussed above rather than via the I/O circuitry 1218 as discussed infra. In one example, the one or more sensors 1214 may be coupled with device 1200 via a short range communication protocol.

The Tx 1211 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11 ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 1218 may include circuitry, such as an external expansion bus (e.g., Universal Serial Bus (USB), FireWire, Thunderbolt, PCI/PCIe/PCIx, etc.), used to connect computer device 1200 with external components/devices, such as one or more sensors 1214, etc. I/O interface circuitry 1218 may include any suitable interface controllers and connectors to interconnect one or more of the processor circuitry 1202, memory circuitry 1204, data storage circuitry 1208, communication circuitry 1205, and the other components of computer device 1200. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 1206), ports, slots, jumpers, interconnect modules, receptacles, modular connectors, etc. The I/O circuitry 1218 may couple the device 1200 with the one or more sensors 1214, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 1214 may be any device configured to detect events or environmental changes, convert the detected events into electrical signals and/or digital data, and transmit/send the signals/data to the computer device 1200. Some of the one or more sensors 1214 may be sensors used for providing computer-generated sensory inputs. Some of the one or more sensors 1214 may be sensors used for motion and/or object detection. Examples of such one or more sensors 1214 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 1214 may include a lens-less image capture mechanism comprising an array of aperture elements, wherein light passing through the array of aperture elements define the pixels of an image. In embodiments, the motion detection one or more sensors 1214 may be coupled with or associated with light generating devices, for example, one or more infrared projectors to project a grid of infrared light onto a scene, where an infrared camera may record reflected infrared light to compute depth information.

Some of the one or more sensors 1214 may be used for position and/or orientation detection, ambient/environmental condition detection, and the like. Examples of such one or more sensors 1214 may include, inter alia, microelectromechanical systems (MEMS) with piezoelectric, piezoresistive and/or capacitive components, which may be used to determine environmental conditions or location information related to the computer device 1200. In embodiments, the MEMS may include 3-axis accelerometers, 3-axis gyroscopes, and/or magnetometers. In some embodinhments, the one or more sensors 1214 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 1202, the hardware accelerator 1203, the memory 1204, the data storage circuitry 1208 including the modules 1209, the input/output interface 1218, the one or more sensors 1214, the communication circuitry 1205 including the Tx 1211, the NIC 1212, the system bus 1206, the computer bus 1239, the device 1231, the device 1235, may perform its conventional functions known in the art. In addition, they may be employed to store and host execution of programming instructions implementing the operations associated with resources sharing across multiple flow-control class and virtual channels in computer buses, as described in connection with FIGS. 1-11, and/or other functions that provides the capability of the embodiments described in the current disclosure. The various elements may be implemented by assembler instructions supported by processor(s) 1202 or high-level languages, such as, for example, C, that can be compiled into such instructions. Operations associated with the device 1200 not implemented in software may be implemented in hardware, e.g., via hardware accelerator 1203.

The number, capability and/or capacity of these elements 1202-1239 may vary, depending on the number of other devices the device 1200 is configured to support. Otherwise, the constitutions of elements 1202-1239 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Furthermore, the present disclosure may take the form of a computer program product embodied in any tangible or non-transitory medium of expression having computer-usable program code embodied in the medium. FIG. 13 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1302 may include a number of programming instructions 1304. Programming instructions 1304 may be configured to enable a device, e.g., device 1300, in response to execution of the programming instructions, to perform, e.g., various operations associated with resources sharing across multiple flow-control class and virtual channels in computer buses, as shown in FIGS. 1-12.

In alternate embodiments, programming instructions 1304 may be disposed on multiple computer-readable non-transitory storage media 1302 instead. In alternate embodiments, programming instructions 1304 may be disposed on computer-readable transitory storage media 1302, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

EXAMPLES

Example 1 may include a device comprising: a device interface to facilitate assignment of the device to a virtual machine (VM) managed by a hypervisor of a computing platform coupled to the device by a computer bus, access of the device by the VM, or removal of the device from being assigned to the VM; wherein the device interface includes logic in support of a device management protocol to place the device interface in an unlocked state as a default state of the device, a locked state to prevent changes to be made to the device interface, an operational state to enable access to device registers of the device by the VM or direct memory access (DMA) from the device to memory address spaces of the VM, or an error state to indicate an error has happened.

Example 2 may include the device of example 1 and/or some other examples herein, wherein the logic in support of the device management protocol is further to report configuration of the device interface to the VM when in locked state; move the device interface into the operational state from the locked state when the device is assigned to the VM and further authorized by a security credential provided by the VM, and further reject untrusted access to register state of the device when in locked state; and move the device interface into the unlocked state when removing the device interface from being assigned to the VM, or when an error condition is detected that compromises the interface assignment, stop access by the VM to the device registers of the device and DMA by the device to memory spaces of the VM.

Example 3 may include the device of example 1 and/or some other examples herein, wherein the VM is a trusted VM which memory contents and central processing unit (CPU) states are kept confidential from the hypervisor and other VMs managed by the hypervisor, and the logic in support of the device management protocol is to place the device interface in the unlocked state, the locked state, or the operational state in a secure manner.

Example 4 may include the device of example 3 and/or some other examples herein, wherein to place the device interface in the unlocked state, the locked state, or the operational state in the secure manner, the logic in support of the device management protocol is to authenticate the device and negotiate a link encryption key with the device to secure communications between the device and the trusted VM, before the device interface of the device is assigned to the trusted VM, and wherein the device is to accept trusted transaction level packets (TLPs) from the trusted VM or to generate trusted TLPs to be sent to the trusted VM, while in the operational state.

Example 5 may include the device of example 4 and/or some other examples herein, wherein to facilitate the assignment of the device to the trusted VM, the device interface is to: receive a request to lock the device interface to move the device interface from the default state to the locked state; send to the trusted VM a device interface report when the device interface is in the locked state; and receive a request to move the device interface to the operational state from the locked state, after the device interface report has been validated by the trusted VM.

Example 6 may include the device of example 5 and/or some other examples herein, wherein to facilitate the assignment of the device to the trusted VM, the device interface is to: determine memory mapped input-output (MMIO) resources mapping between the trusted VM and the device; and receive an allocation of the memory address spaces of the trusted VM for the device interface to host the MMIO resources.

Example 7 may include the device of example 4 and/or some other examples herein, wherein to facilitate the removal of the device from being assigned to the trusted VM, the device interface is to: stop access by the trusted VM to the device registers of the device and DMA by the device to the memory address spaces of the trusted VM; remove the device interface from being assigned to the trusted VM; clear up security information resulted in the assignment to the trusted VM; remove the MIMO resources assigned to the trusted VM.

Example 8 may include the device of example 1 and/or some other examples herein, wherein the device interface includes a physical function, a virtual function, or an assignable device interface.

Example 9 may include the device of example 1 and/or some other examples herein, wherein the computer bus to couple the device and the computing platform includes a peripheral component interconnect (PCI) bus, a PCI Extended bus (PCI-X), a PCI express bus, a CLX 2.0 bus, or a CLX 1.1 bus.

Example 10 may include the device of example 1 and/or some other examples herein, wherein the device includes a mouse, a disk, a keyboard, a memory device, or an input/output controller.

Example 11 may include at least one or more non-transitory computer-readable media having instructions thereon that in response to execution of the instructions by one or more hardware processors of a computing platform, provide a virtual machine (VM) on the computing platform, including: a device driver to facilitate assignment of a device interface for a device to the VM managed by a hypervisor of the computing platform, access of the device by the VM, or removal of the device from being assigned to the VM, wherein the device is coupled to the computing platform by a computer bus; and wherein the device driver includes support of a device management protocol to cause the device interface to be placed in a default unlocked state, a locked state to prevent changes to be made to the device interface, an operational state to enable access to device registers of the device by the VM or direct memory access (DMA) from the device to memory address spaces of the VM, or an error state to indicate an error has happened.

Example 12 may include the one or more non-transitory computer-readable media of example 11 and/or some other examples herein, wherein the device driver, in support of the device management protocol, is further to receive from the device interface a configuration report of the device interface, instruct the device interface to move into the operational state from the locked state when the device is assigned to the VM, and further instruct the device interface to move into the unlocked state when removing the device interface from being assigned to the VM, thereby stopping access by the VM to the device registers of the device and DMA by the device to memory spaces of the VM.

Example 13 may include the one or more non-transitory computer-readable media of example 11 and/or some other examples herein, wherein the VM is a trusted VM which memory contents and processor states of the trusted VM are kept confidential from the hypervisor and other VMs managed by the hypervisor, and the device driver, in support of the device management protocol, is to cause the device interface to be placed in the unlocked state, the locked state, or the operational state in a secure manner.

Example 14 may include the one or more non-transitory computer-readable media of example 13 and/or some other examples herein, wherein to facilitate the assignment of the device interface for the device to the trusted VM includes to: send a request to lock the device interface to move the device interface from the default state to the locked state; receive from the device interface a device interface report when the device interface is in the locked state; validate the device interface report; and send a request to move the device interface to the operational state from the locked state after the device interface report has been validated.

Example 15 may include the one or more non-transitory computer-readable media of example 13 and/or some other examples herein, wherein to assign the device interface of the device to the trusted VM further includes to: determine memory mapped input-output (MMIO) resources mapping between the trusted VM and the device; and determine an allocation of the memory address spaces of the trusted VM for the device interface to host the MMIO resources.

Example 16 may include the one or more non-transitory computer-readable media of example 13 and/or some other examples herein, wherein to facilitate the removal of the device from being assigned to the trusted VM includes to: stop access to the device registers of the device; stop DMA by the device to the memory address spaces of the trusted VM; remove the device interface from being assigned to the trusted VM; and remove the MMIO resources assigned to the trusted VM.

Example 17 may include a computing platform, comprising: one or more processors; and a hypervisor arranged to operate on the one or more processors, wherein the hypervisor is arranged to: manage operations of a virtual machine (VM); and facilitate assignment of a device interface of a device to the VM, access of the device by the VM, or removal of the device from being assigned to the VM; wherein the device is coupled to the computing platform by a computer bus, and wherein the device interface includes logic in support of a device management protocol to place the device interface in an unlocked state as a default state of the device, a locked state to prevent changes to be made to the device interface, an operational state to enable access to device registers of the device by the VM or direct memory access (DMA) from the device to memory address spaces of the VM, or an error state to indicate an error has happened.

Example 18 may include the computing platform of example 17 and/or some other examples herein, wherein the VM is a trusted VM that memory contents and central processing unit (CPU) states of the trusted VM are kept confidential from the hypervisor and other VMs managed by the hypervisor, and to facilitate assignment of the device interface of the device to the trusted VM includes to: authenticate the device and negotiate a link encryption key to secure communications between the device and the trusted VM, before the device interface of the device is assigned to the trusted VM; and transmit and receive, when the device interface is at the operational state, trusted transaction level packets (TLPs) between the trusted VM and the device.

Example 19 may include the computing platform of example 18 and/or some other examples herein, wherein the trusted VM is a first trusted VM, the device interface is a first device interface, and the computing platform further includes a second trusted VM managed by the hypervisor, and wherein the hypervisor is further arranged to: assign a second device interface of the device to the second trusted VM to move the second device interface to the operational state.

Example 20 may include the computing platform of example 18 and/or some other examples herein, wherein the trusted VM is a first VM, and the computing platform further includes a second VM managed by the hypervisor that is not a trusted VM.

Example 21 may include the computing platform of example 18 and/or some other examples herein, wherein to facilitate the assignment of the device interface of the device to the VM, the hypervisor is arranged to: configure the device interface to be assigned to the VM; compose a virtual device (VDEV) backed with the device interface; send a request to lock the device interface to move the device interface from the default state to the locked state; receive from the device interface a device interface report when the device interface is in the locked state; and assign the VDEV to the VM.

Example 22 may include at least one or more non-transitory computer-readable media having instructions thereon that in response to execution of the instructions by one or more hardware processors of a computing platform, provide a resource arbitration module arranged to be operated by a hypervisor on the computing platform, to: manage assignment of a device interface for a device to a virtual machine (VM) managed by the hypervisor, access of the device by the VM, or removal of the device from being assigned to the VM, wherein the device is coupled to the computing platform by a computer bus; and wherein the resource arbitration module includes support of a device management protocol to cause the device interface to be placed in a default unlocked state, a locked state to prevent changes to be made to the device interface, or an operational state to enable access to device registers of the device by the VM or direct memory access (DMA) from the device to memory address spaces of the VM.

Example 23 may include the one or more non-transitory computer-readable media of example 22 and/or some other examples herein, wherein the resource arbitration module, in support of the device management protocol, is further to receive from the device interface a configuration report of the device interface, instruct the device interface to move into the operational state from the locked state when the device is assigned to the VM, and further instruct the device interface to move into the unlocked state when removing the device interface from being assigned to the VM, thereby stopping access by the VM to the device registers of the device and DMA by the device to memory spaces of the VM.

Example 24 may include the one or more non-transitory computer-readable media of example 22 and/or some other examples herein, wherein the VM is a trusted VM which memory contents and processor states of the trusted VM are kept confidential from the hypervisor and other VMs managed by the hypervisor, and the resource arbitration module, in support of the device management protocol, is to cause the device interface to be placed in the unlocked state, the locked state, or the operational state in a secure manner.

Example 25 may include the one or more non-transitory computer-readable media of example 24 and/or some other examples herein, wherein the trusted VM is a first trusted VM, the device interface is a first device interface, and the computing platform further includes a second trusted VM managed by the hypervisor, and wherein the resource arbitration module is further to assign a second device interface of the device to the second trusted VM to move the second device interface to the operational state.

Example 26 may include an apparatus comprising: means for interface security management for computer buses.

Example 27 may include an apparatus comprising means to perform one or more elements of a method described in or related to any of examples herein, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example 29 may include an apparatus comprising logic, modules, or circuitry to perform one or more elements of a method described in or related to any of examples herein, or any other method or process described herein.

Example 30 may include a method, technique, or process as described in or related to any of examples herein, or portions or parts thereof.

Example 31 may include an apparatus comprising: one or more processors and one or more computer readable media comprising instructions that, when executed by the one or more processors, cause the one or more processors to perform the method, techniques, or process as described in or related to any of examples herein, or portions thereof.

Example 32 may include a signal as described in or related to any of examples herein, or portions or parts thereof.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A device comprising:
   a device interface to facilitate assignment of the device to a trusted virtual machine (VM) managed by a hypervisor of a computing platform coupled to the device by a computer bus, access of the device by the trusted VM, or removal of the device from being assigned to the trusted VM;
   wherein the device interface includes logic in support of a device management protocol to place the device interface in an unlocked state as a default state of the device, a locked state to prevent changes to be made to the device interface, an operational state to enable access to device registers of the device by the trusted VM or direct memory access (DMA) from the device to memory address spaces of the trusted VM, or an error state to indicate an error has happened; and
   wherein to place the device interface in the unlocked state, the locked state, or the operational state in the secure manner, the logic in support of the device management protocol is to authenticate the device and negotiate a link encryption key with the device to secure communications between the device and the trusted VM, before the device interface of the device is assigned to the trusted VM, and wherein the device is to accept trusted transaction level packets (TLPs) from the trusted VM or to generate trusted TLPs to be sent to the trusted VM, while in the operational state.

2. The device of claim 1, wherein the logic in support of the device management protocol is further to report configuration of the device interface to the trusted VM when in the locked state, and further reject untrusted access to a register state of the device when in the locked state;
   move the device interface into the operational state from the locked state when the device is assigned to the trusted VM and further authorized by a security credential provided by the VM; and
   move the device interface into the unlocked state when removing the device interface from being assigned to the trusted VM, or when an error condition is detected that compromises the interface assignment, stop access by the trusted VM to the device registers of the device and DMA by the device to memory spaces of the trusted VM.

3. The device of claim 1, wherein memory contents and central processing unit (CPU) states of the trusted VM are kept confidential from the hypervisor and other VMs managed by the hypervisor, and the logic in support of the device management protocol is to place the device interface in the unlocked state, the locked state, or the operational state in a secure manner.

4. The device of claim 1, wherein to facilitate the assignment of the device to the trusted VM, the device interface is to:
   receive a request to lock the device interface to move the device interface from the default state to the locked state;
   send to the trusted VM a device interface report when the device interface is in the locked state; and
   receive a request to move the device interface to the operational state from the locked state, after the device interface report has been validated by the trusted VM.

5. The device of claim 4, wherein to facilitate the assignment of the device to the trusted VM, the device interface is to:
   determine memory mapped input-output (MMIO) resources mapping between the trusted VM and the device; and
   receive an allocation of the memory address spaces of the trusted VM for the device interface to host the MMIO resources.

6. The device of claim 1, wherein to facilitate the removal of the device from being assigned to the trusted VM, the device interface is to:
   stop access by the trusted VM to the device registers of the device and DMA by the device to the memory address spaces of the trusted VM;
   remove the device interface from being assigned to the trusted VM;
   clear up security information resulting from the assignment to the trusted VM; and
   remove the MMIO resources assigned to the trusted VM.

7. The device of claim 1, wherein the device interface includes a physical function, a virtual function, or an assignable device interface.

8. The device of claim 1, wherein the computer bus to couple the device and the computing platform includes a peripheral component interconnect (PCI) bus, a PCI Extended bus (PCI-X), a PCI express bus, a CLX 2.0 bus, or a CLX 1.1 bus.

9. The device of claim 1, wherein the device includes a mouse, a disk, a keyboard, a memory device, or an input/output controller.

10. At least one or more non-transitory computer-readable media having instructions thereon that in response to execution of the instructions by one or more hardware processors of a computing platform, provide a virtual machine (VM) on the computing platform, including:
    a device driver to facilitate assignment of a device interface for a device to the VM managed by a hypervisor of the computing platform, access of the device by the VM, or removal of the device from being assigned to the VM,
    wherein the device is coupled to the computing platform by a computer bus;
    wherein the device driver includes support of a device management protocol to cause the device interface to be placed in a default unlocked state, a locked state to prevent changes to be made to the device interface, an operational state to enable access to device registers of the device by the VM or direct memory access (DMA) from the device to memory address spaces of the VM, or an error state to indicate an error has happened; and wherein the device driver, in support of the device management protocol, is further to receive from the device interface a configuration report of the device interface, instruct the device interface to move into the operational state from the locked state when the device is assigned to the VM, and further instruct the device interface to move into the unlocked state when removing the device interface from being assigned to the VM, thereby stopping access by the VM to the device registers of the device and DMA by the device to memory spaces of the VM.

11. The one or more non-transitory computer-readable media of claim 10, wherein the VM is a trusted VM which memory contents and processor states of the trusted VM are kept confidential from the hypervisor and other VMs managed by the hypervisor, and the device driver, in support of the device management protocol, is to cause the device interface to be placed in the unlocked state, the locked state, or the operational state in a secure manner.

12. The one or more non-transitory computer-readable media of claim 11, wherein to facilitate the assignment of the device interface for the device to the trusted VM includes to:
send a request to lock the device interface to move the device interface from the default state to the locked state;
receive from the device interface a device interface report when the device interface is in the locked state;
validate the device interface report; and
send a request to move the device interface to the operational state from the locked state after the device interface report has been validated.

13. The one or more non-transitory computer-readable media of claim 11, wherein to assign the device interface of the device to the trusted VM further includes to:
determine memory mapped input-output (MMIO) resources mapping between the trusted VM and the device; and
determine an allocation of the memory address spaces of the trusted VM for the device interface to host the MMIO resources.

14. The one or more non-transitory computer-readable media of claim 11, wherein to facilitate the removal of the device from being assigned to the trusted VM includes to:
stop access to the device registers of the device;
stop DMA by the device to the memory address spaces of the trusted VM;
remove the device interface from being assigned to the trusted VM; and
remove the MMIO resources assigned to the trusted VM.

15. A computing platform, comprising:
one or more processors; and
a hypervisor arranged to operate on the one or more processors, wherein the hypervisor is arranged to:
manage operations of a virtual machine (VM); and
facilitate assignment of a device interface of a device to the VM, access of the device by the VM, or removal of the device from being assigned to the VM;
wherein the device is coupled to the computing platform by a computer bus;
wherein the device interface includes logic in support of a device management protocol to place the device interface in an unlocked state as a default state of the device, a locked state to prevent changes to be made to the device interface, an operational state to enable access to device registers of the device by the VM or direct memory access (DMA) from the device to memory address spaces of the VM, or an error state to indicate an error has happened; and wherein the VM is a trusted VM that memory contents and central processing unit (CPU) states of the trusted VM are kept confidential from the hypervisor and other VMs managed by the hypervisor, and to facilitate the assignment of the device interface of the device to the trusted VM includes to:
authenticate the device and negotiate a link encryption key to secure communications between the device and the trusted VM, before the device interface of the device is assigned to the trusted VM; and
transmit and receive, when the device interface is at the operational state, trusted transaction level packets (TLPs) between the trusted VM and the device.

16. The computing platform of claim 15, wherein the trusted VM is a first trusted VM, the device interface is a first device interface, and the computing platform further includes a second trusted VM managed by the hypervisor, and wherein the hypervisor is further arranged to:
assign a second device interface of the device to the second trusted VM to move the second device interface to the operational state.

17. The computing platform of claim 15, wherein the trusted VM is a first VM, and the computing platform further includes a second VM managed by the hypervisor that is not a trusted VM.

18. The computing platform of claim 15, wherein to facilitate the assignment of the device interface of the device to the VM, the hypervisor is arranged to:
configure the device interface to be assigned to the VM;
compose a virtual device (VDEV) backed with the device interface;
send a request to lock the device interface to move the device interface from the default state to the locked state;
receive from the device interface a device interface report when the device interface is in the locked state; and
assign the VDEV to the VM.

19. At least one or more non-transitory computer-readable media having instructions thereon that in response to execution of the instructions by one or more hardware processors of a computing platform, provide a resource arbitration module arranged to be operated by a hypervisor on the computing platform, to:
manage assignment of a device interface for a device to a virtual machine (VM) managed by the hypervisor, access of the device by the VM, or removal of the device from being assigned to the VM,
wherein the device is coupled to the computing platform by a computer bus;
wherein the resource arbitration module includes support of a device management protocol to cause the device interface to be placed in a default unlocked state, a locked state to prevent changes from being made to the device interface, or an operational state to enable access to device registers of the device by the VM or direct memory access (DMA) from the device to memory address spaces of the VM; and
wherein the resource arbitration module, in support of the device management protocol, is further to receive from the device interface a configuration report of the device interface, instruct the device interface to move into the operational state from the locked state when the device is assigned to the VM, and further instruct the device interface to move into the unlocked state when removing the device interface from being assigned to the VM, thereby stopping access by the VM to the device registers of the device and DMA by the device to memory spaces of the VM.

20. The one or more non-transitory computer-readable media of claim 19, wherein the VM is a trusted VM which memory contents and processor states of the trusted VM are kept confidential from the hypervisor and other VMs managed by the hypervisor, and the resource arbitration module, in support of the device management protocol, is to cause the device interface to be placed in the unlocked state, the locked state, or the operational state in a secure manner.

21. The one or more non-transitory computer-readable media of claim 20, wherein the trusted VM is a first trusted VM, the device interface is a first device interface, and the computing platform further includes a second trusted VM managed by the hypervisor, and wherein the resource arbitration module is further to assign a second device interface of the device to the second trusted VM to move the second device interface to the operational state.

* * * * *